US010169191B2

(12) United States Patent
Barsness et al.

(10) Patent No.: US 10,169,191 B2
(45) Date of Patent: *Jan. 1, 2019

(54) WARNING DATA MANAGEMENT WITH RESPECT TO A DEVELOPMENT PHASE

(71) Applicant: International Business Machines Corporation, Armonk, NY (US)

(72) Inventors: Eric L. Barsness, Pine Island, MN (US); Alexander Cook, Rochester, MN (US); Manuel Orozco, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/136,893

(22) Filed: Apr. 23, 2016

(65) Prior Publication Data

US 2017/0308457 A1    Oct. 26, 2017

(51) Int. Cl.
  *G06F 9/44*  (2018.01)
  *G06F 11/36*  (2006.01)
  *G06F 8/41*  (2018.01)

(52) U.S. Cl.
  CPC .......... *G06F 11/3616* (2013.01); *G06F 8/436* (2013.01)

(58) Field of Classification Search
  USPC ........................................................ 717/131
  See application file for complete search history.

(56) References Cited

U.S. PATENT DOCUMENTS

| 5,673,390 | A | 9/1997 | Mueller | |
| 7,203,881 | B1* | 4/2007 | Williams | ............ G06F 11/0709 702/185 |
| 7,913,237 | B2 | 3/2011 | Acott et al. | |
| 8,527,814 | B1* | 9/2013 | Elwell | ................. G06F 11/0709 714/2 |
| 2005/0188346 | A1 | 8/2005 | Hogg et al. | |
| 2006/0053075 | A1* | 3/2006 | Roth | ...................... G06Q 10/06 705/50 |

(Continued)

OTHER PUBLICATIONS

Anonymously; "Providing Preventive Warning Messages to Users Using Various Interactive Applications"; http://ip.com/IPCOM/000236733; Mar. 13, 2014.

(Continued)

*Primary Examiner* — Chameli Das
(74) *Attorney, Agent, or Firm* — Gilbert Harmon, Jr.

(57) ABSTRACT

Aspects of the disclosure relate to managing a set of warning data with respect to a development phase in a computing environment. In embodiments, the computing environment may include a distributed computing environment or a stream computing environment. The set of warning data may be detected with respect to the development phase. In embodiments, the set of warning data may be used to develop an application. By analyzing the set of warning data, a relationship between the set of warning data and a component of the application may be identified. In embodiments, the component of the application may include a computing artifact or a computing object. An indication of the relationship between the set of warning data and the component of the application may be provided for utilization to develop the application.

21 Claims, 19 Drawing Sheets

(56) References Cited

U.S. PATENT DOCUMENTS

| | | | |
|---|---|---|---|
| 2006/0150015 A1* | 7/2006 | Kondajeri | G06F 11/0712 714/23 |
| 2006/0161903 A1* | 7/2006 | Anand | G06F 8/20 717/132 |
| 2008/0077326 A1 | 3/2008 | Funk | |
| 2008/0109683 A1* | 5/2008 | Erwin | G06F 11/079 714/46 |
| 2008/0247532 A1 | 10/2008 | Schulz | |
| 2009/0128581 A1 | 5/2009 | Brid et al. | |
| 2009/0157224 A1 | 6/2009 | Blanc et al. | |
| 2011/0066902 A1 | 3/2011 | Sharon | |
| 2011/0289487 A1* | 11/2011 | Song | G06F 11/3624 717/130 |
| 2013/0055223 A1 | 2/2013 | Xu | |
| 2013/0167122 A1 | 6/2013 | Chasman et al. | |
| 2013/0326467 A1 | 12/2013 | Nair et al. | |
| 2014/0109037 A1* | 4/2014 | Ouali | G06F 8/10 717/105 |
| 2014/0172710 A1* | 6/2014 | Brody | G06Q 20/0655 705/44 |
| 2014/0325657 A1* | 10/2014 | Bailey | H04L 63/1433 726/25 |
| 2015/0074249 A1* | 3/2015 | Connelly | H04L 63/102 709/220 |
| 2015/0188871 A1* | 7/2015 | Lewis | H04L 51/24 709/207 |
| 2015/0227350 A1 | 8/2015 | Kannan | |
| 2015/0277864 A1 | 10/2015 | Muramatsu | |
| 2015/0339104 A1 | 11/2015 | Frenkiel et al. | |
| 2015/0370690 A1* | 12/2015 | Rodmell | G06F 11/008 717/124 |
| 2016/0062821 A1* | 3/2016 | Yoon | G06F 11/1048 714/763 |
| 2016/0132318 A1* | 5/2016 | Hu | G06F 8/65 717/172 |
| 2016/0253256 A1 | 9/2016 | Singh | |
| 2016/0266203 A1 | 9/2016 | Hamid et al. | |
| 2016/0300252 A1 | 10/2016 | Frank et al. | |
| 2017/0091013 A1 | 3/2017 | Tallam | |
| 2017/0102988 A1 | 4/2017 | Purushothaman et al. | |

OTHER PUBLICATIONS

Anonymously; "Functionality of Web Based Advice for Application's Error/Warning Message"; http://ip.com/IPCOM/000240245; Jan. 15, 2015.

Hertz et al.; "Status Report on the Clean Process Advisory System: New Process Design Tools for Environmental Sustainability"; http://ip.com/IPCOM/000217299; Aug. 1994.

List of IBM Patents or Patent Applications Treated as Related.

\* cited by examiner

WARNING DATA MANAGEMENT WITH RESPECT TO A DEVELOPMENT PHASE

BACKGROUND

This disclosure relates generally to computer systems and, more particularly, relates to managing warning data associated with a computing environment. The amount of data that needs to be managed by enterprises is increasing. Management of warning data may be desired to be performed as efficiently as possible. As data needing to be managed increases, the need for management efficiency may increase.

SUMMARY

Aspects of the disclosure relate to collecting and storing warning data to, for example, facilitate the development of distributed or stream computing applications such as via debugging or the like. During the code development process, certain portions of the code may have associated warning information that inform users/developers of potential errors or issues with respect to various aspects of the code. Accordingly, aspects of the disclosure relate to detecting and storing this warning information along with the associated code. The warning data may be used to correlate problems with corresponding causes and identify solutions. The warning data may be provided to offer information to users/developers regarding both suggested and discouraged actions.

Aspects of the disclosure relate to managing a set of warning data with respect to a development phase in a computing environment. In embodiments, the computing environment may include a distributed computing environment or a stream computing environment. The set of warning data may be detected with respect to the development phase. In embodiments, the set of warning data may be used to develop an application. By analyzing the set of warning data, a relationship between the set of warning data and a component of the application may be identified. In embodiments, the component of the application may include a computing artifact or a computing object. An indication of the relationship between the set of warning data and the component of the application may be provided for utilization to develop the application.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
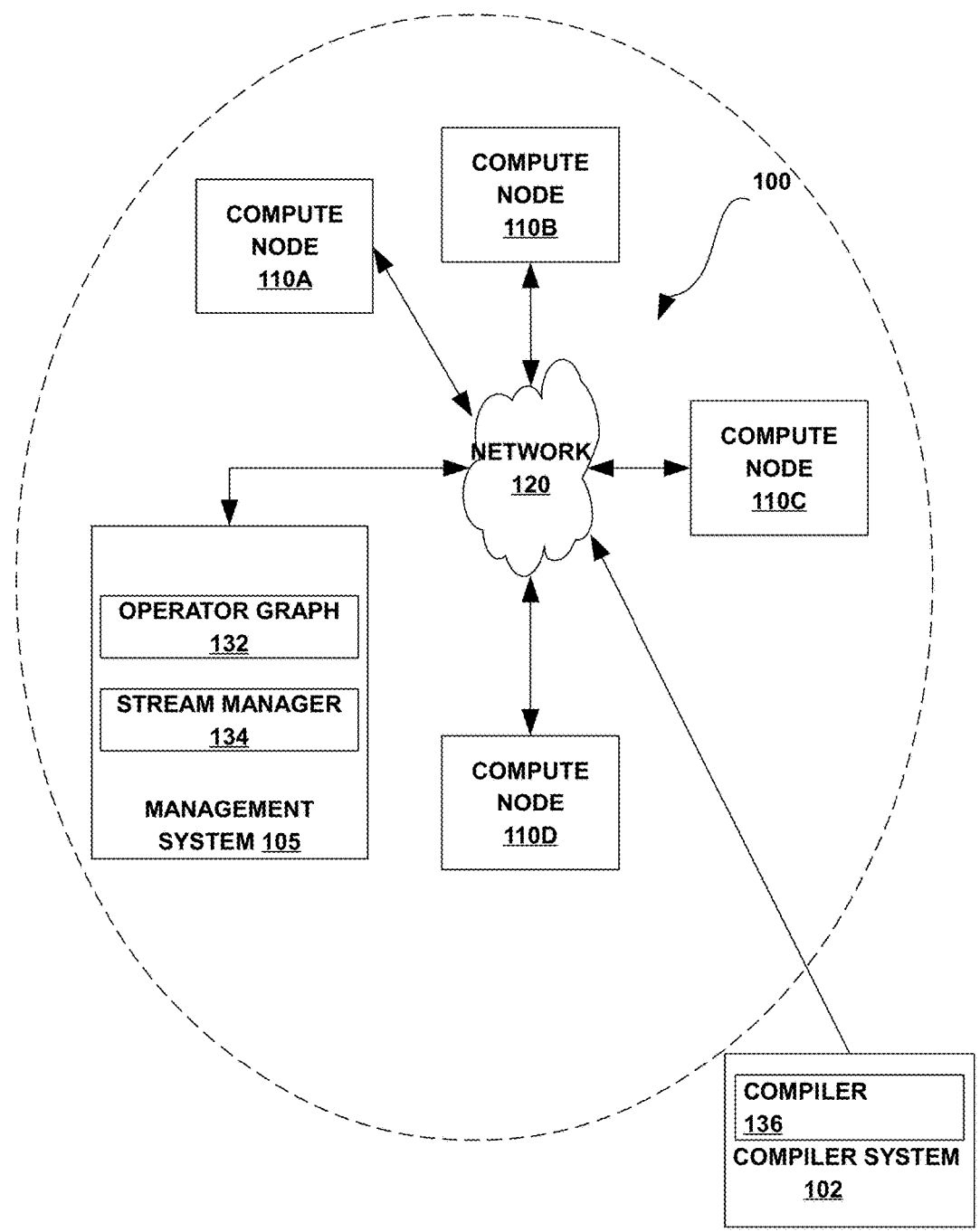
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to collecting and storing warning data to facilitate the development of computing applications such as stream/distributed computing applications. During the code development process (e.g., requirements, design, construction, testing, debugging, deployment, maintenance), certain portions of the code may have associated warning information (e.g., compile time warnings) that inform users/developers of potential errors or issues with respect to various aspects of the code (e.g., operator fusion incompatibilities). Accordingly, aspects of the disclosure relate to detecting and storing this warning information along with the associated code. The warning data may be used to correlate problems with corresponding causes and identify solutions. The warning data may be provided (e.g., in an integrated development environment) to offer information to users/developers regarding both suggested and discouraged actions.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, map, list, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

At different stages of the code/design/development process, information becomes available that may be beneficial to utilize during subsequent steps of the development process. One example where this concept is illustrated is during the compilation phase of code development, where code compilers provide warning messages to developers. In some instances, the code is compiled without this information, and the warning messages are lost. Similarly, modifications that happen at the just-in-time (JIT) compilation phase are often performed with no persistent record of what was changed. Accordingly, aspects of the disclosure relate to collecting and storing this information for later use in subsequent code development steps.

In embodiments, aspects of the disclosure relate to displaying (e.g., within a streams runtime operator graph or within a static compilation graph) which processing elements and operators were compiled with warnings. The type of and number of warnings may be presented. In embodiments, the compile time warning messages may be captured at compilation time and stored with the compiled code such that they may be displayed within either local or remote integrated development environments (IDEs). In embodiments, the compile time warning messages may be configured to be accessed in environments where only the compiled code objects (e.g., and not the original source code) are available.

In embodiments, runtime and compile-time operator fusion decisions may be based on the warning message information. In the event that an operator encounters an error, data regarding the operator failure may be tied to the warning messages, and candidate corrective actions may be suggested. Additionally, in the case of JIT compilation, information can be gathered and updated during execution time. As described herein, performance or efficiency benefits may result from managing the set of warning data (e.g., wear-rate, service-length, speed, flexibility, load balancing, responsiveness, high availability, resource usage, productivity). Aspects may save resources such as bandwidth, processing, or memory.

Aspects of the disclosure relate to capturing compilation warning messages at application compile time. These messages can then be categorized along with potential issues that may result from the warnings, and are correlated with the operator and line of code associated with the warning. This information can then be stored within the IDE for viewing by users/developers, and made accessible to both the streams runtime and streams compiler for future usage. In embodiments, operators with compiler warnings may be highlighted within the IDE. Configuration options may include filtering the operators to selectively look at just operators with warning messages, color-coding different types of warning messages, and the like. In embodiments, the line of code or section of code that caused the warning during execution may also be highlighted.

In the event that an operator encounters an error, the processing element log files can be scanned to see where the failure occurred, and parsed to identify the reason for the failure. This information may then be correlated back to the saved warning information to facilitate prediction of future errors. As an example, a line of code associated with an error may be correlated with a warning message. Additionally, during compilation of the streaming application and during the fusion step of said compilation, provisions may be made for discouraging fusion of operators that are compiled with warning messages, discourage fusion of operators with certain warning messages, and notifying the user/developer of the operators being fused. Similarly, when the system performs dynamic fusing of operators at runtime, this information can be used to make decisions on what may be dynamically fused.

Aspects of the disclosure relate to collecting and storing warning data to facilitate the development of computing applications. At various stages of the code development process, warning messages may occur in relation to one or more portions of the programming code. For instance, warning messages may occur in a compilation phase, an execution phase (e.g., in response to performing just-in-time compilation), or in a development phase. Aspects of the disclosure relate to collecting and storing these compiler and interpreter warnings along with compiled computing artifacts. The collected warning data may then be utilized at other stages of code development. For instance, in embodiments the collected warning data may be correlated with related problems or error events. Accordingly, if an error event arises (e.g., runtime error), the collected warning messages may be checked to determine whether or not information pertaining to the error event (e.g., identified causes, solutions) is available. As another example, warning data may be used within an integrated development environment (IDE). For instance, in the event of operator failure, warning data may be collected to report a potential problem with the operator. Operators associated with warnings may be highlighted within the IDE for ease of identification. In embodiments, the warning data may be used to influence operator fusion decisions. Other uses for the warning data are also possible.

In embodiments, aspects of the disclosure relate to performing one or more of the steps described herein in a distributed computing environment. Generally, the distributed computing environment may include a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. The distributed computing environment may include one or more of a private cloud, community cloud, public cloud, hybrid cloud, or other deployment model configured to provide software, digital platform, or infrastructure based services. In embodiments, the distributed computing method may be associated with characteristics including on-demand self service, broad network access, resource pooling, rapid elasticity, measured service and the like. In embodiments, the distributed computing environment may include one or more computing nodes configured to implement various aspects of the method described herein for warning data management. Other types of distributed computing environments are also possible.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
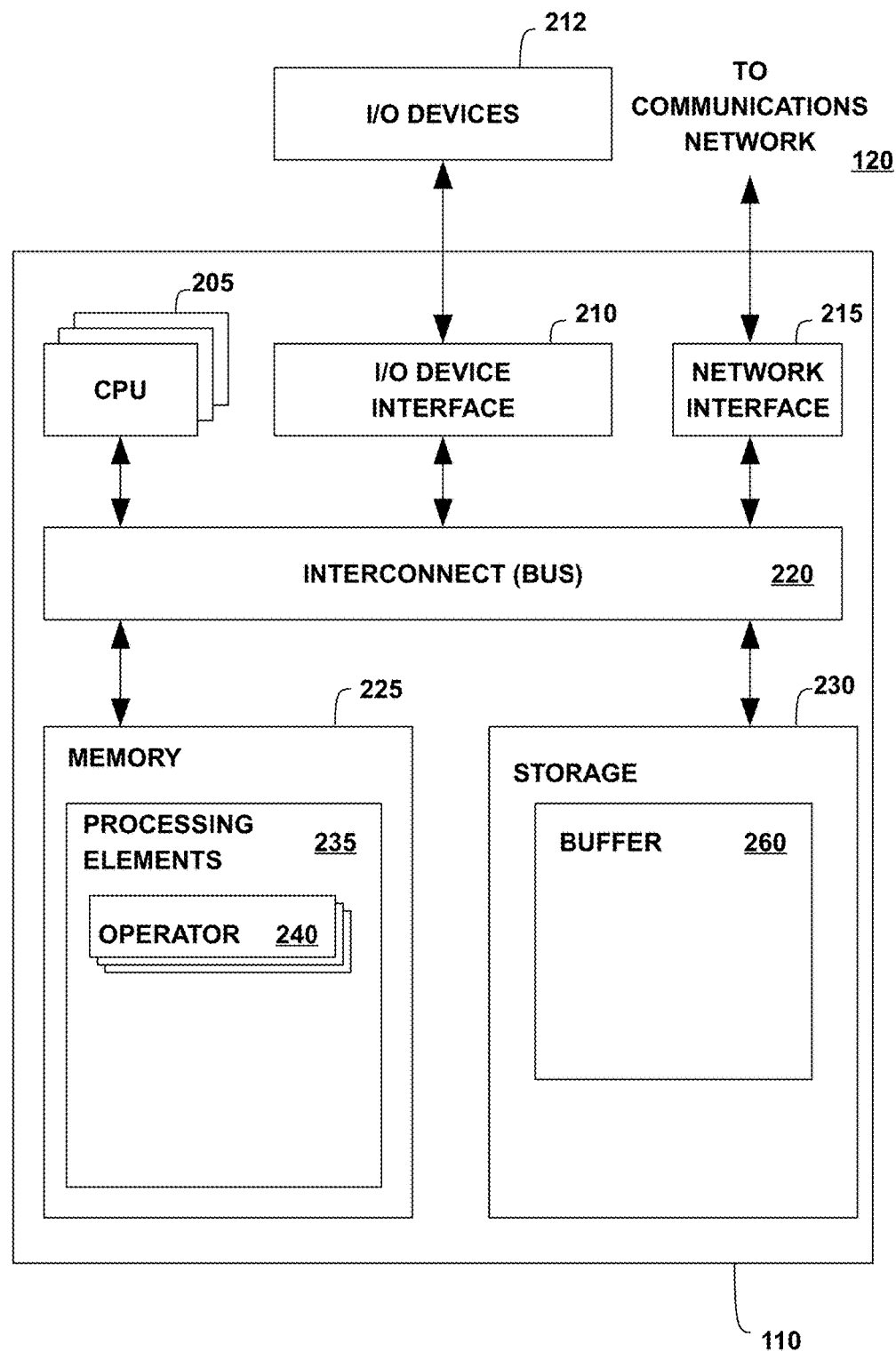
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
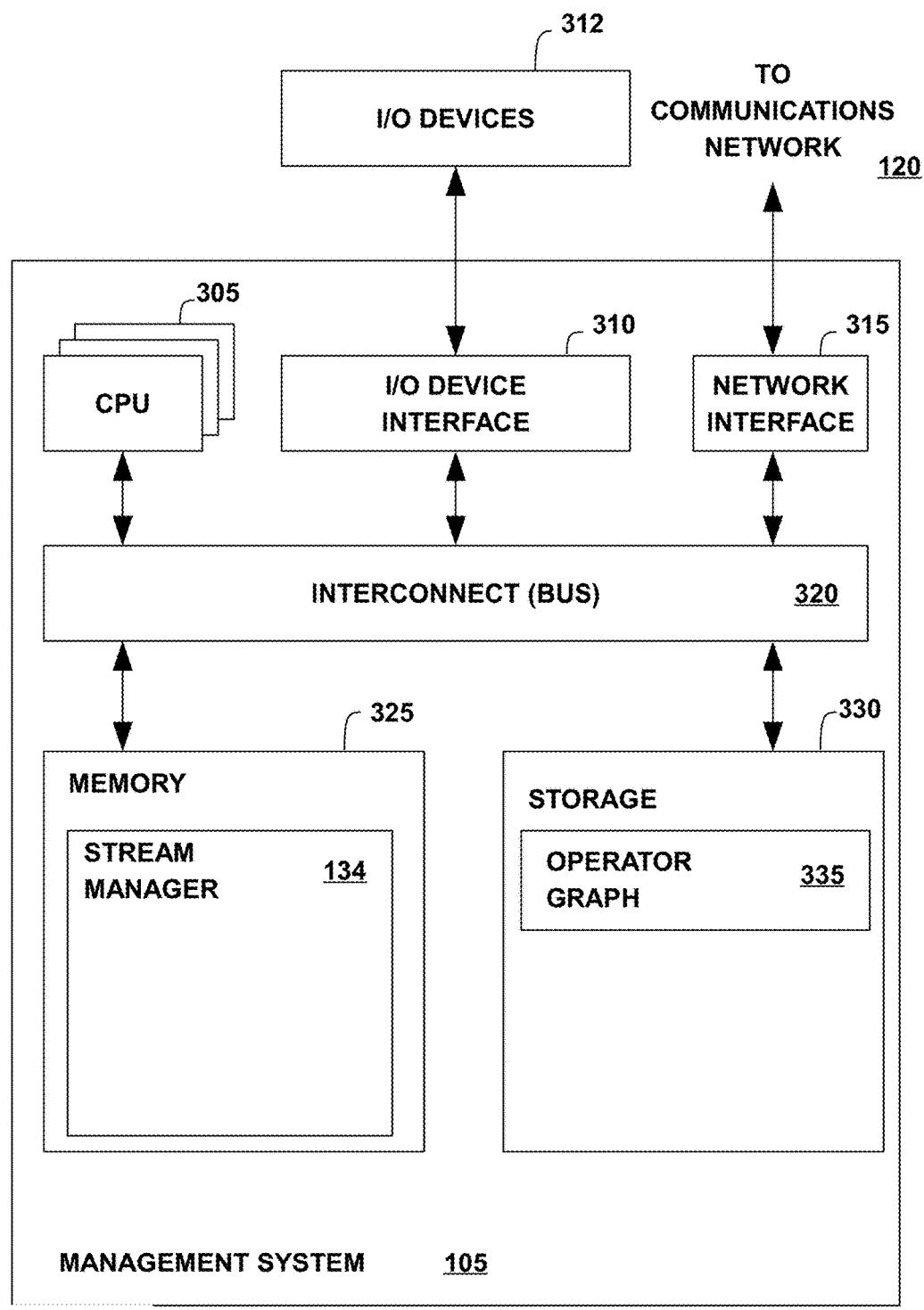
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
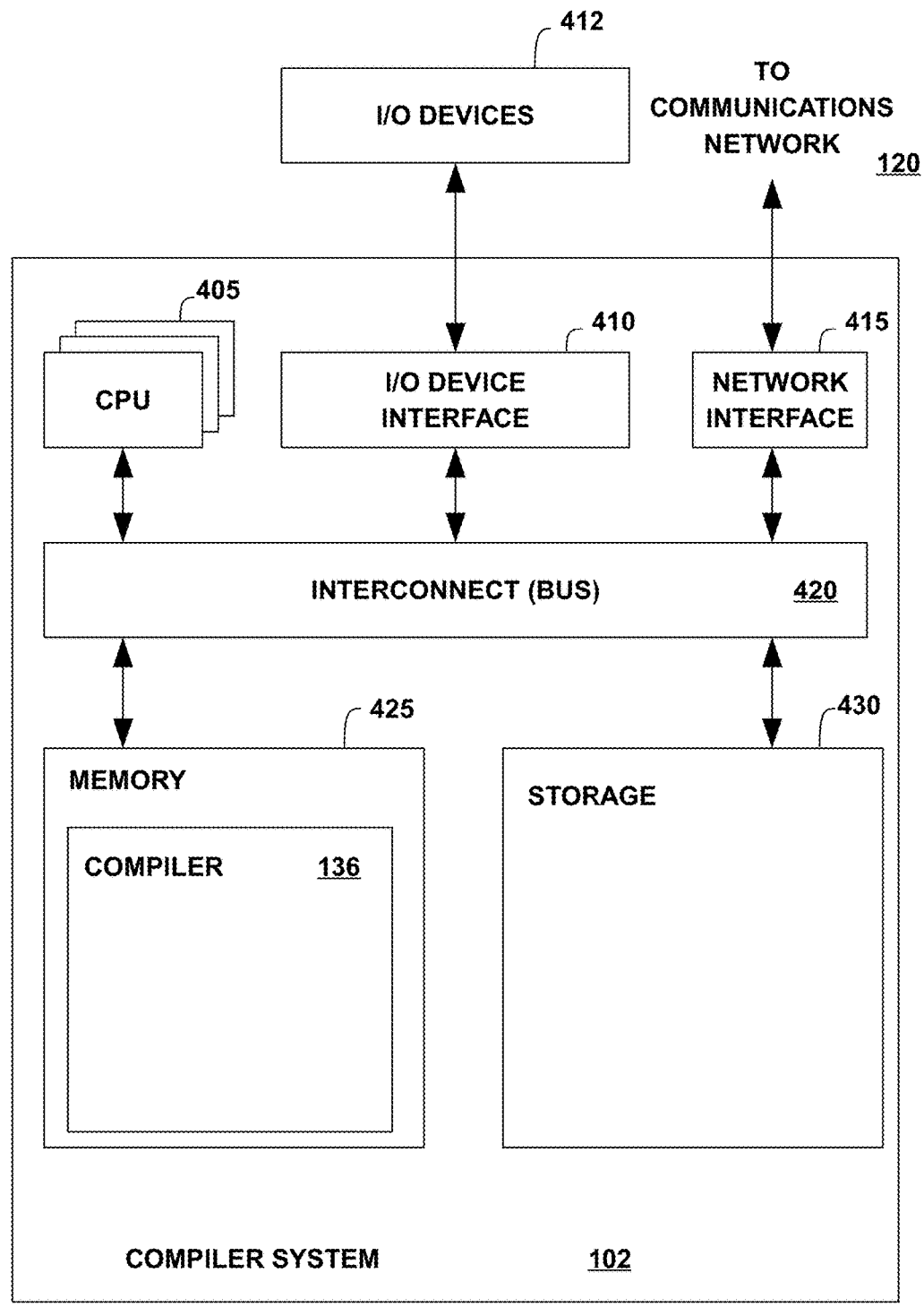
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In embodiments, a streams application bundle or streams application bundle file may be created. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
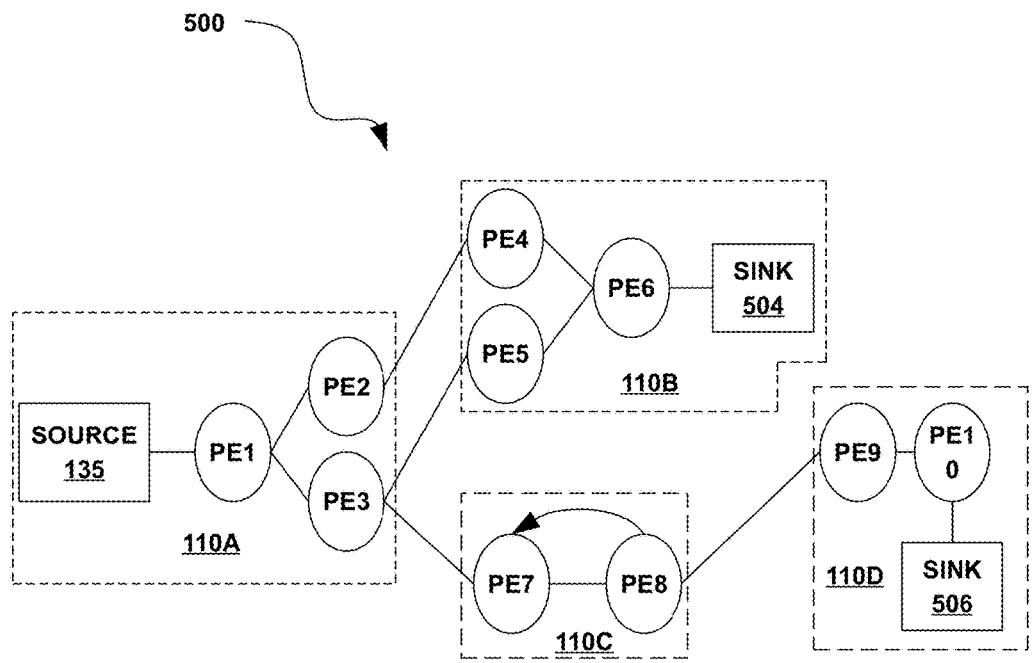
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
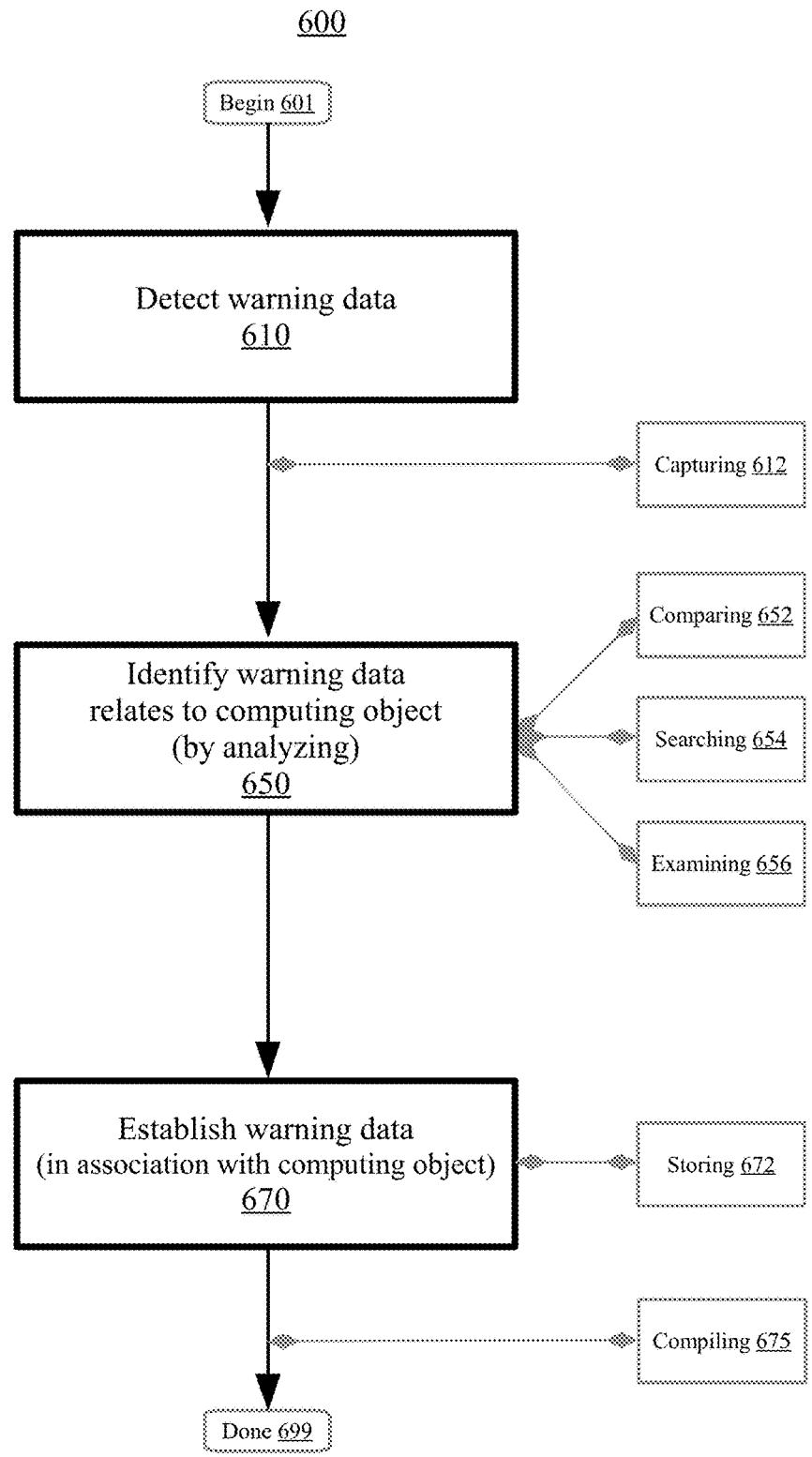
FIG. 6 is a flowchart illustrating a method for managing a set of warning data with respect to a compilation phase in a computing environment, according to embodiments.

FIG. 6 is a flowchart illustrating a method 600 for managing a set of warning data with respect to a compilation phase in a computing environment, according to embodiments. In embodiments, the computing environment may include a distributed computing environment or a stream computing environment. The compilation phase may generally include the generation of programming code written in a first programming language (e.g., a high-level programming language) and the translation, conversion, or transformation of the programming code into a second programming language (e.g., a lower-level programming language such as assembly language or machine code) using a compiler. The compilation phase may include converting the source code to create an executable program to be run by a computer. In embodiments, a set of warning data may occur during the compilation phase. Aspects of the disclosure relate to utilizing the set of warning data to facilitate the development of various application programs. Method 600 may begin at block 601.

At block 610, the set of warning data may be detected. The set of warning data may be detected with respect to the compilation phase (of a code development process). Generally, detecting can include monitoring, recognizing, discovering, ascertaining, discerning, or otherwise identifying the set of warning data. Detecting may include identifying that a set of programming code includes the set of warning data. In embodiments, detecting the set of warning data may include monitoring the computing environment and identifying warning data that occurs with respect to one or more aspects of the set of programming code. As an example, in certain embodiments, detecting the set of warning data may include identifying a notification of a syntax error (e.g., in response to parsing/scanning the set of programming code) with respect to a portion of the programming code. Other methods of detecting the set of warning data are also possible.

As described herein, aspects of the disclosure relate to detecting a set of warning data. The set of warning data may include information, notifications, alerts, recommendations, and other forms of data that indicate the presence of a potential error, mistake, irregularity, problem or other issue with respect to a computing object, computing artifact, or computing environment. The set of warning data may include information regarding suggested or recommended actions, discouraged actions, potential incompatibilities, or other information relevant to the code development process or the computing environment. In embodiments, the set of warning data may be detected during the compilation phase of the code development process. As an example, in certain embodiments, a warning data message may be triggered by a user action (e.g., a user entering mistaken syntax or an incompatible/unsupported operator into the programming code) and be detected in response. In embodiments, the number of syntax errors associated with a particular location, portion, or aspect of an application may be tracked and recorded. Information regarding the number of syntax errors may be collected and stored along with the warning data for utilization at a subsequence stage of the development process (e.g., the number of syntax errors associated with a code portion may be used to gauge the relative difficulty of the coding a particular aspect of the application). In certain embodiments, the warning data may be detected at compilation time. Other methods of detecting the set of warning data are also possible.

Consider the following example. In certain embodiments, the set of warning data may include a warning message regarding a portion of code that calls a deprecated method. Generally, deprecated methods may include outdated aspects of code that may no longer be supported by certain machine configurations. In certain embodiments, utilization of deprecated methods may be associated with system instability, data corruption, or other potential risks. Accordingly, aspects of the disclosure relate to detecting warning data (e.g., including deprecated methods) to facilitate development of stream applications. For instance, the functions included in a particular block of code may all be tested and checked to identify whether any deprecated methods are included. In response to the detection of a deprecated method, a set of warning data may be generated. Other methods of detecting the set of warning data are also possible.

In embodiments, in response to detecting the set of warning data, the set of warning data may be captured at block 612. The set of warning data may be captured for inclusion when compiling a computing artifact. The computing artifact may include a computing object (e.g., set of programming code) that has been compiled to create an executable program. Generally, capturing the set of warning data may include saving, collecting, gathering, aggregating, maintaining, or otherwise storing the set of warning data. In embodiments, capturing the set of warning data may include recording information regarding the set of warning data in a data log. The data log may be maintained internally (e.g., within the same data file that contains the programming data) or externally (e.g., in a separate file linked with the programming data). As an example, capturing the set of warning data may include documenting the time and date the warning was detected, content of the warning, warning severity, affected code portions, potential consequences, candidate solutions, related warning data, archived data pertaining to the warning, and other relevant information in a data log. In embodiments, capturing the set of warning data may include acquiring image or video data (e.g., pictures of the warning message, video footage illustrating candidate solutions) and storing it in the data log. As described herein, the captured information regarding the warning data may be included in compilation of the programming code. Other methods of capturing the set of warning data area also possible.

At block 650, by analyzing the set of warning data, it may be identified that the set of warning data relates to a computing object. Generally, identifying may include recognizing, ascertaining, deciding, resolving, or otherwise determining a relationship or correspondence between the warning data and the computing object. For example, identifying may include ascertaining how the set of warning data relates to the computing object. The computing object may include a set, portion, or line of implementation code, a code location, or other aspect of the implementation code that is indicated by the set of warning data. In embodiments, identifying that the set of warning data relates to a computing object may include determining that the set of warning data references, calls out, or otherwise indicates a particular portion or location of the computing object (e.g., programming code). As an example, identifying that the set of warning data relates to a computing object may include ascertaining that a particular warning message (e.g., "assignment in conditional") calls out a certain line of code (e.g., "if (x=5);" x=5 will evaluate to the value "5" which is always true) as being the source of the warning. Other methods of identifying that the set of warning data relates to a computing object are also possible.

As described herein, identifying that the set of warning data relates to a computing object may include analyzing the set of warning data. Generally, analyzing the set of warning data may include parsing the warning data or metadata pertaining to the warning data to determine the nature of the relationship between the set of warning data and the computing object. In embodiments, analyzing can include determining information regarding the content of the warning data (e.g., trigger parameter, type of error). Analyzing can include examining (e.g., performing an inspection of the warning data), evaluating (e.g., generating an appraisal of the warning data), resolving (e.g., ascertaining an observation/conclusion/answer with respect to the warning data), parsing (e.g., deciphering structured and unstructured data constructs of the warning data), querying (e.g., asking a question regarding the warning data), or categorizing (e.g., organizing by a feature or type of the warning data). Data analysis may include a process of inspecting, cleaning, transforming, or modeling data to discover useful information, suggest conclusions, or support decisions. Data analysis can extract information/patterns from a data set and transform/translate it into an understandable structure for further use. Other methods of analyzing the set of warning data are also possible.

In embodiments, the set of warning data may be compared with a warning table at block 652. The warning table may include a set of benchmark warning values. Generally, comparing may include contrasting, correlating, juxtaposing, matching, evaluating, or otherwise examining the set of warning data with respect to the warning table. The warning table may include a database, directory, index, or other structured body of information that includes the set of benchmark warning values and other archived data pertaining to the set of warning data. In embodiments, the warning table may include identification codes, detailed error descriptions, candidate problem solutions, and other information regarding the set of warning data. In certain embodiments, the warning table may include explanations describing a variety of potential configurations (e.g., conflicting parameters, mistakenly defined variables) that may have led to occurrence of the warning data, (still) image or video data illustrating candidate solutions, and the like. In embodiments, comparing may include referencing the warning table to identify a data entry corresponding to a particular warning message and correlating the information associated with the data entry with the set of warning data. Other methods of comparing the set of warning data and the warning table are also possible.

In certain embodiments, the warning table may include a set of benchmark values. The set of benchmark values may include a scale, ranking, index, graduated hierarchy, or other system for quantitatively evaluating the set of warning data. In embodiments, the set of benchmark values may be used to indicate the relative severity (e.g., measure of how serious or impactful a particular issue is) of the set of warning data. For instance, one or more benchmark values may be assigned to a particular warning message of the set of warning data to express the extent or degree of the severity of the issue specified by the warning message. The benchmark values may be expressed as integer values between 0 and 100, wherein lesser values represent a lesser degree of severity and greater values represent a greater degree of severity. As an example, a warning message related to an uninitialized variable may be assigned a benchmark value of 17 (e.g., such errors may be minor and easily resolved) while a warning issue regarding integer overflow may be assigned a benchmark value of 74 (e.g., such errors may lead to data corruption and system instability if left unresolved). In embodiments, the benchmark values may be determined dynamically based on the configuration of the computing object and the nature of the set of warning data (e.g., the same warning message may have different levels of severity in different contexts). Other uses for the benchmark values besides those explicitly described herein are also possible.

Consider the following example code segment:

```
const char* mystring = "xyzzy";
char* another = "xyzzy";
strcpy(another,"ABCDE");
cout << mystring << endl;
```

In certain embodiments, the example code above may be associated with a set of warning data that states the following message: "conversion from string const to char." In embodiments, this warning message may arise in response to detection of an assignment of a string constant (e.g., literal) to a non constant character. In certain embodiments, this warning message may be assigned a benchmark value of 22 (e.g., in some computing environments, support may exist for assigning string constants to non constant characters). In certain computing environments, common string constants may shared between multiple strings, such that modification of a value in one location may lead to unintended changes to variables in other code locations. Accordingly, in such scenarios, the warning message may be assigned a benchmark value of 68 (e.g., assignment of string constants to non constant characters may represent a more severe issue in computing environments where there is a risk of contention between strings). Other methods of assigning benchmark values are also possible.

In embodiments, a set of profile information may be searched for a nature of a particular warning at block 654. Searching the set of profile information for the nature of the particular warning may include using the set of warning data. Generally, searching may include inspecting, investigating, seeking, or otherwise examining the set of profile information. In various embodiments, the set of profile information may correspond to a particular operator (e.g., streaming operator), software application, computer task, operating system, hardware device, or other physical or virtual resource. In certain embodiments, the set of profile information may be included in the warning table described herein. In embodiments, searching the set of profile information may include using one or more of a warning identification code, key terms of the warning message, or metadata associated with the warning message to ascertain a portion of the set of profile information that is related to the warning message. The set of profile information may include a characterization or description of a particular warning message that provides information regarding the type, triggering thresholds (e.g., particular configuration in which a warning message occurs), candidate solutions, historical data and other data pertaining to the warning message. By searching the set of profile information, a nature of the warning message may be identified. The nature of the warning message may include information such as potential causes of the warning, candidate solutions, detailed warning explanations and the like. In embodiments, the nature of the warning message may be correlated with the set of warning data. Other methods of searching the set of profile information are also possible.

In embodiments, the computing object may be examined at block 656. The computing object may be examined for a connection with the set of warning data. Examining may include analyzing, inspecting, evaluating, or otherwise investigating the computing object to determine a link, correlation, relationship or other association between the set of warning data and the computing object. In embodiments, examining the computing object may include parsing the programming code of the computing object to identify one or more potential causes of the warning data. More particularly, in certain embodiments a static code analysis tool may be utilized to inspect the programming code for code parameters or other portions of the code that may have lead to the occurrence of a particular warning message. As an example, in the case of a warning message regarding ambiguous function definitions, the computing object may be examined to locate those portions of the code where functions are declared and identify a subset of those functions that may be the cause of the warning data. Data and information regarding the connection between the set of warning data and the computing object may be correlated with the set of warning data. Other methods of examining the computing object are also possible.

Consider the following example. In certain embodiments, a computing object may include the following warning message: "control reaches end of non-void function." In embodiments, this warning message may occur when a function has been defined as returning a result, but no return statement has been included to return the result. Accordingly, examining the computing object may include scanning the code to identify one or more locations that may be the cause of the warning message. For instance, in certain embodiments, a particular code location may be identified that includes a function that does not contain a statement. As such, the code location may be linked to the set of warning data. Other methods of examining the computing object are also possible.

At block 670, the warning data may be established in association with the computing object. Establishing the warning data may include generating, creating, storing, associating, relating, joining, correlating, or otherwise forming a link between the set of warning data and the computing object. In embodiments, establishing the set of warning data in association with the computing object may include assembling the information collected regarding the relationship between the set of warning data and the computing object (e.g., benchmark value data, nature of the warning data, connection between the warning message and the computing object) and linking it together with the computing object (e.g., in a particular form). For instance, as an example, linking the set of warning data with the computing object may include tagging one or more elements of the computing object (e.g., specific operators, lines of code, functions) with call-out tags that reference specific portions of the warning data. As described herein, establishing the warning data in association with the computing object may facilitate aspects of the code development process. Other methods of establishing the warning data in association with the computing object are also possible.

In embodiments, the set of warning data and a set of implementation code may be stored at block 672. As described herein, the set of warning data may be linked with the set of implementation code. Storing may include saving, bundling, or maintaining the warning data and the implementation code together such that mutual data access, retrieval, modification, and other tasks that access or utilize one or more of the set of warning data and the implementation code may be smoothly performed. In embodiments, storing may include bundling the set of warning data together with the set of implementation code in a single digital package. For instance, in embodiments the set of warning data may be saved within the same file container as the set of implementation code (e.g., the implementation code and the set of warning data may be saved as different sheets of the same file). In certain embodiments, the set of warning data and the set of implementation code may be saved as separate file packages that share mutual access authorization. As an example, as described herein, in various embodiments the set of implementation code may be annotated with callouts that reference particular associated portions of the set of warning data. Other methods of storing the set of warning data and the set of implementation code are also possible.

In embodiments, a computing artifact may be compiled at block 675. The computing artifact may include a digital package, bundle, or container including the computing object in association with the set of warning data. Compiling may include the translation, conversion, or transformation of the programming code into a target programming language (e.g., from a high-level programming language to a lower-level programming language such as assembly language or machine code) using a compiler. In embodiments, compiling may include converting the computing object into an executable program file. As described herein, aspects of the disclosure are directed toward compiling the computing object together with the set of warning data to generate the computing artifact. Other methods of compiling the computing object are also possible.

Consider the following example. A set of implementation code for a streaming application may be in-development at a stage prior to code compilation. The set of implementation code may be periodically monitored by a static code analysis tool for errors and irregularities. As described herein, in certain embodiments a set of warning data may be detected with respect to the set of implementation code (e.g., in response to monitoring). For instance, a set of warning data may be detected that displays the following message: "Unary minus operator applied to unsigned type, result still unsigned." In response to detection of the set of warning data, the set of warning data may be captured. For example, capturing the set of warning data may include recording details of the error message in a warning message log, and saving an image of the warning data message.

As described herein, it may be identified that the warning data relates to a computing object by analyzing the warning data. Analyzing may include one or more of comparing (e.g., to a warning table), searching (e.g., a set of profile data), or examining (e.g., the computing object). For instance, the warning data may be compared to a warning table and a benchmark value of 59 (e.g., indicative of moderate severity) may be determined for the warning data regarding the unary minus operator. By searching a set of profile data (e.g., of the unary minus operator) the following information may be identified: "Unsigned types can hold only non-negative values, so unary negation may not apply to an unsigned type." The information identified in the set of profile data for the unary minus operator may be correlated to the set of warning data. In embodiments, the computing object (e.g., the implementation code) may be examined for a connection to the warning data. As an example, examining the computing object may locate a line of code where an unsigned comparison caused by the unsigned type leads to a false statement. Accordingly, in certain embodiments, this line of code may be identified as a potential cause of the warning indicated by the set of warning data.

In embodiments, the set of warning data may be established in association with the computing object. As described herein, establishing may include storing the warning data, benchmark value, operator profile data, and potential cause of the set of warning data (e.g., information associated with the set of warning data in response to comparing, searching, and examining) together with the computing object. For instance, this information may be saved together in the same file as the computing object. In embodiments, aspects of the disclosure relate to compiling the computing object along with the set of warning data to generate a computing artifact. Other methods of managing the set of warning data are also possible.

In certain embodiments, the detecting, identifying, and establishing steps described herein may each occur in an automated fashion without user invention. In embodiments, the detecting, identifying, establishing, and other steps described herein may be carried out by a warning management tool included in the code development platform used to develop the computing object. In certain embodiments, the steps described herein may be carried out by a warning management module located separately from the code development platform containing the computing object. For instance, the warning management module may be hosted by a remote computing device that is accessible to the code development platform (e.g., through a subscription, usage-based, or other service model).

Method 600 concludes at block 699. Aspects of method 600 may provide performance or efficiency benefits for warning data management. For example, aspects of method 600 may have positive impacts with respect to development of a streaming application. As described herein, the detecting, identifying, and establishing described herein may each occur in an automated fashion without user invention. Altogether, leveraging the information provided by compilation phase warning messages may be associated with performance or efficiency benefits (e.g., development speed, error elimination, computing resource efficiency).

Figure 7:
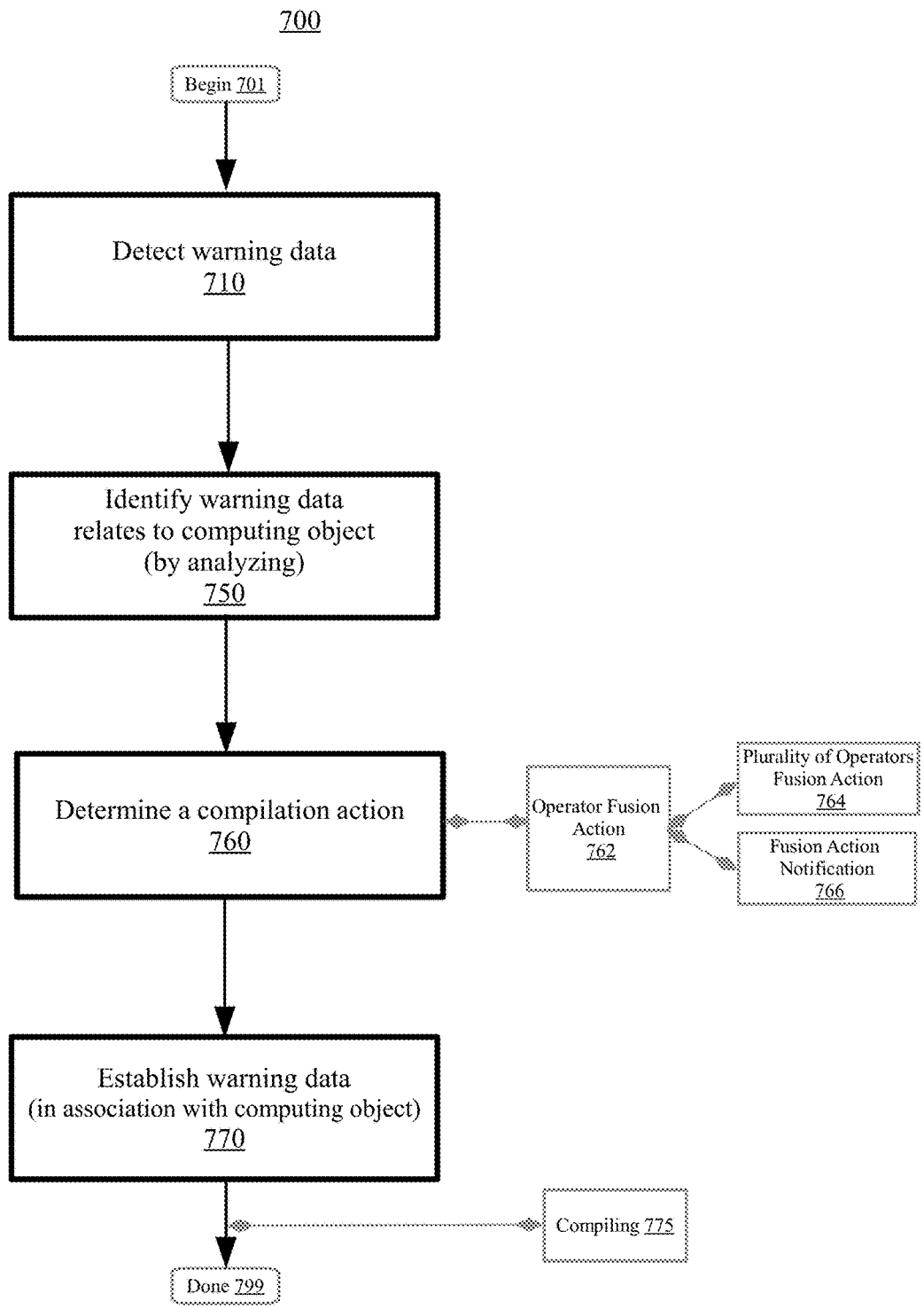
FIG. 7 is a flowchart illustrating a method for managing a set of warning data with respect to a compilation phase in a computing environment, according to embodiments.

FIG. 7 is a flowchart illustrating a method 700 for managing a set of warning data with respect to a compilation phase in a computing environment, according to embodiments. Aspects of the method 700 may relate to determining a compilation action. The method 700 may begin at block 701. A set of warning data may be detected at block 710. At block 750, it may be identified that the set of warning data relates to a computing object by analyzing the set of warning data. At block 760, a compilation action may be determined. At block 770, the set of warning data may be established in association with the computing object. At block 775, the set of warning data may be compiled together with the computing object to generate a computing artifact. Aspects of the method 700 may substantially correspond to other embodiments described herein, including FIGS. 1-19.

At block 760, aspects of method 700 relate to determining a compilation action. The compilation action may be determined based on the set of warning data. Generally, determining may include ascertaining, computing, resolving, or otherwise identifying the compilation action. The compilation action may be a task, job, operation, activity, or other process performed during the compilation phase of the code development process. In embodiments, determining may include analyzing the computing artifact and ascertaining one or more compilation actions which may be associated with positive impacts with respect to the computing artifact or the set of warning data. For example, the compilation action may include using a code analysis tool to analyze the computing artifact and revise any discovered errors (e.g., to reduce the warning messages of the set of warning data). Other types of compilation actions are also possible.

As described herein, determination of the compilation action may be based on the set of warning data. In embodiments, an aspect of the warning data may be identified that indicates an effect, impact, or other influence on or more candidate compilation actions. Accordingly, in certain embodiments a particular compilation action may be identified (e.g., for selection) as being associated with positive impacts with respect to the set of warning data. As an example, a compilation action that includes running a code debugger tool may be associated with benefits such as revision of the programming code and elimination of the set of warning data. In certain embodiments, a particular compilation action may be identified (e.g., to avoid) as possibly leading to undesirable consequences with respect to the set of warning data. For instance, a compilation action that includes utilization of an operator associated with a warning message may be avoided (e.g., depending on the nature of the warning message, utilization of the operator may result in unstable behavior). Other methods of determining the compilation action are also possible.

In embodiments, data flow decisions in a streaming application may be based on the set of warning data. Consider an example streaming application that includes operators A, B, and C, such that operator A is configured to send tuples to either operator B or operator C. In embodiments, warning data operator C may be associated with warning messages that may lead to irregular or unstable behavior. Accordingly, aspects of the disclosure relate to redirecting a flow of tuples to avoid operator C (e.g., thread splitting). For instance, in certain embodiments, operator A may be configured to route the flow of tuples to operator B. In certain embodiments, the flow of tuples may be first routed to another operator to avoid operator C. Other methods of managing data flow based on the set of warning data are also possible.

In embodiments, the compilation action can include an operator fusion action at block 762. Generally, operator fusion may include the process of joining or combining a plurality of operators (e.g., streaming operators) together to form a single processing element. Operator fusion may be associated with benefits such as code simplification, processing efficiency, and resource management. In embodiments, a fusion operation corresponding to a plurality of operators may be performed at block 764. The fusion operation may include fusing one or more operators into a single processing element. As described herein, the fusion action may be based on the set of warning data. For instance, in various embodiments, operators that are associated with the set of warning data may be prevented from fusing with other operators. In embodiments, the nature of the warning data may be analyzed to determine whether fusion between particular operators may be safely and reliably performed. In embodiments, a fusion action notification may be provided at block 766. The fusion action notification may include an alert, request for verification, or other statement related to the fusion action. In certain embodiments, the fusion action notification may be provided to a user or developer prior to performance of the fusion action in order to inform the user of the pending operator fusion. For instance, the fusion action notification may request the user's authorization to fuse one or more operators associated with warning data. Other types of operator fusion actions and compilation actions beyond those described explicitly herein are also possible.

Method 700 concludes at block 799. Aspects of method 700 may provide performance or efficiency benefits for warning data management. For example, aspects of method 700 may have positive impacts with respect to compilation action determination and operator fusion. As described herein, the detecting, identifying, and establishing described herein may each occur in an automated fashion without user invention. Altogether, leveraging the information provided by compilation phase warning messages may be associated with performance or efficiency benefits (e.g., development speed, error elimination, computing resource efficiency).

Figure 8:
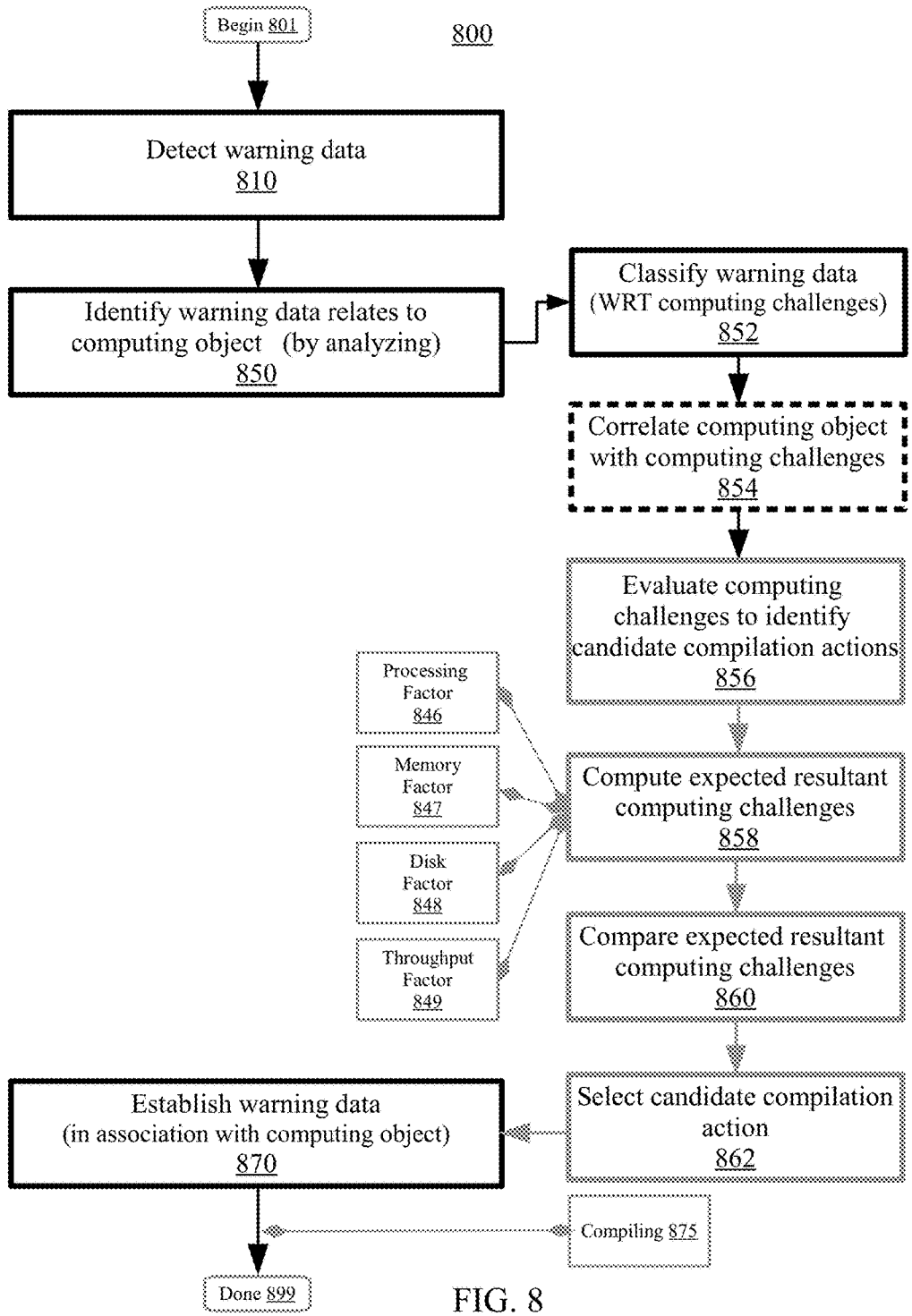
FIG. 8 is a flowchart illustrating a method for managing a set of warning data with respect to a compilation phase in a computing environment, according to embodiments.

FIG. 8 is a flowchart illustrating a method 800 for managing a set of warning data with respect to a compilation phase in a computing environment, according to embodiments. Aspects of the method 800 may relate to a set of computing challenges. The method 800 may begin at block 801. A set of warning data may be detected at block 810. At block 850, it may be identified that the set of warning data relates to a computing object by analyzing the set of warning data. At block 870, the set of warning data may be established in association with the computing object. At block 875, the set of warning data may be compiled together with the computing object to generate a computing artifact. Aspects of the method 800 may substantially correspond to other embodiments described herein, including FIGS. 1-19.

In embodiments, the set of warning data may be classified with respect to a set of computing challenges at block 852. Classifying may include categorizing, organizing, mapping, arranging, or grouping the set of warning data. In embodiments, the set of warning data may be classified with respect to a set of computing challenges. Generally, the computing challenges may include computing performance, virtual machine management, computing resource demands, software instability, software or hardware error rates, software incompatibilities, power management and the like. In certain embodiments, the computing challenges may relate to stream operator performance in a streaming application. As examples, the computing challenges may include issues related to the management of throughput rate, processing resources, memory resources, and storage resources utilized by a set of streaming operators deployed in a streaming application. As described herein, the set of warning data may be classified with respect to the set of computing challenges. In embodiments, classifying the warning data may include sorting the warning data into groups of related computing challenges. For example, a first set of warning data that indicates possible impacts to the throughput rate may be sorted into a first group of computing challenges related to throughput rate issues, while a second set of warning data that indicates a potential influence to the processing resource utilization of one or more operators may be sorted into a second group of computing challenges related to processor resource utilization issues. Other methods of classifying the set of computing challenges are also possible.

In embodiments, the set of computing challenges may be correlated with the computing object at block 854. Generally, correlating may include linking, relating, associating, or otherwise connecting the set of computing challenges with the computing object. In embodiments, correlating the computing challenges with the computing object may include linking one or more computing challenges with one or more portions of the programming code included in the computing object. For instance, correlating may include annotating a line of code or other code location of the computing object with a computing challenge tag that indicates a relation to a particular computing challenge. Consider the following example. A first code location of the computing object may include a function that defines the amount of processing resources allocated to a particular stream operator. In embodiments, the amount of processing resources defined by the function for allocation to a particular stream operator may limit the throughput rate achievable by the stream operator such that occurrence of a stream flow bottleneck is predicted. Accordingly, the first code location may be annotated with a computing challenge tag that indicates a relation to stream operator throughput issues. Other methods of correlating the set of computing challenges with the computing object are also possible.

In embodiments, the set of computing challenges may be evaluated at block 856. The set of computing challenges may be evaluated to identify a set of candidate compilation actions. The set of candidate compilation actions may include both a first candidate compilation action and a second candidate compilation action. Generally, evaluating the set of computing challenges may include analyzing, examining, or inspecting the computing challenges. In embodiments, evaluating the set of computing challenges may include examining the set of warning data and the computing object associated with a particular computing challenge to identify the first and second candidate compilation actions. In certain embodiments, evaluating the set of computing challenges to identify the set of candidate compilation actions may include analyzing aggregated historical information and archived data associated with the set of warning data (e.g., profile information, historical performance metrics). As described herein, the first and second candidate compilation actions may include tasks, jobs, operations, activities, or other processes performed during the execution phase of the code development process. In embodiments, the first and second candidate compilation actions may include suggested solutions or other corrective measures recommended to positively impact the computing challenges (e.g., solutions or actions that were used in the past to reduce similar computing challenges, as indicated by historical utilization and performance data). As examples, the candidate compilation actions may include operator fusion actions, fusion action notifications, parameter adjustments, code debugging, operator replacement, or other processes. Other methods of evaluating the computing challenges to identify the candidate compilation actions are also possible.

In embodiments, one or more expected resultant computing challenges may be computed at block 858. The expected resultant computing challenges may include a first expected resultant computing challenge for the first candidate compilation action and a second expected resultant computing challenge for the second candidate compilation action. Generally, computing may include calculating, determining, appraising, evaluating, or otherwise ascertaining the expected resultant computing challenges. In embodiments, computing the expected resultant computing challenges may include analyzing archived utilization records and historical performance data to calculate a predicted or estimated outcome of a particular compilation action. In embodiments, the expected resultant computing challenges may include a set of values or other quantitative indications of the anticipated result of the compilation action. The set of values may correspond to one or more of a processing utilization factor (e.g., central processing unit resources usage) at block 846, a memory utilization factor (e.g., random access memory resources usage) at block 847, a disk utilization factor (e.g., persistent storage resources usage) at block 848, or a throughput factor (e.g., network bandwidth resources) at block 849. As an example, for a candidate compilation action that includes a parameter adjustment to a function that defines the amount of processing resources to be allocated to a particular stream operator, an expected resultant value including a throughput rate of 700 tuples per second (e.g., the predicted throughput rate expected from the streaming operator based on the function adjustment) may be computed for the candidate compilation action (e.g., in certain situations the throughput rate of an operator may be dependent on the processing resources it is allocated). Other methods of computing the expected resultant computing challenge are also possible.

In embodiments, a plurality of expected resultant computing challenges may be compared at block 860. As described herein, aspects of the disclosure relate to comparing a first expected resultant computing challenge corresponding to a first candidate compilation action with a second expected resultant computing challenge corresponding to a second candidate compilation action. Generally, comparing the expected resultant computing challenges may include contrasting, correlating, juxtaposing, matching, evaluating, or otherwise examining the expected resultant computing challenges with respect to each other. In embodiments, comparing the first and second expected resultant computing challenges may include separately modeling the predicted performance behavior that may result from executing the first candidate compilation action and the second compilation action. As an example, performance metrics including graphs and charts illustrating expected resource utilization and data flow (e.g., tuple throughput) may be generated for multiple scenarios (e.g., a first scenario based on the first expected resultant computing challenge and a second scenario based on the second expected resultant computing challenge.) Other methods of comparing the first and second expected resultant computing challenges are also possible.

In embodiments, a candidate compilation action may be selected at block 862. Selecting a candidate compilation action may include selecting one of the candidate compilation actions corresponding to the expected resultant computing challenges compared at block 860 (e.g., the first or second candidate compilation action). Generally, selecting may include choosing, electing, deciding, picking, ascertaining, or otherwise determining the candidate compilation action. The selected candidate compilation action may be performed, added to a command queue for scheduling, or provided to a user for authentication. Selecting can include, for example, storing a data value (e.g., entering a digit/character in a database), transmitting a data object (e.g., sending an object having metadata), routing a message (e.g., publishing a startup expectation), or providing/performing/processing an operation (e.g., a notification). In embodiments, selecting the candidate compilation action may be based on determining that one of the expected resultant computing challenges (e.g., the first expected resultant computing challenge) exceeds one or more other expected resultant computing challenges (e.g., the second expected resultant computing challenge). For instance, referring to the example described above, the performance behavior models and other performance metrics for each of the expected resultant computing challenges may be analyzed, and an expected resultant computing challenge that leads to a desirable performance outcome (e.g., resource usage efficiency, faster data processing speed) may be determined. Accordingly, the candidate compilation action corresponding to the determined expected resultant computing challenge may be selected. Other methods of selecting the candidate compilation action are also possible.

Method 800 concludes at block 899. Aspects of method 800 may provide performance or efficiency benefits for warning data management. For example, aspects of method 800 may have positive impacts with respect to management of a set of computing challenges and candidate compilation actions associated with a set of warning data. As described herein, the detecting, identifying, and establishing described herein may each occur in an automated fashion without user invention. Altogether, leveraging the information provided by compilation phase warning messages may be associated with performance or efficiency benefits (e.g., development speed, error elimination, computing resource efficiency).

Figure 9:
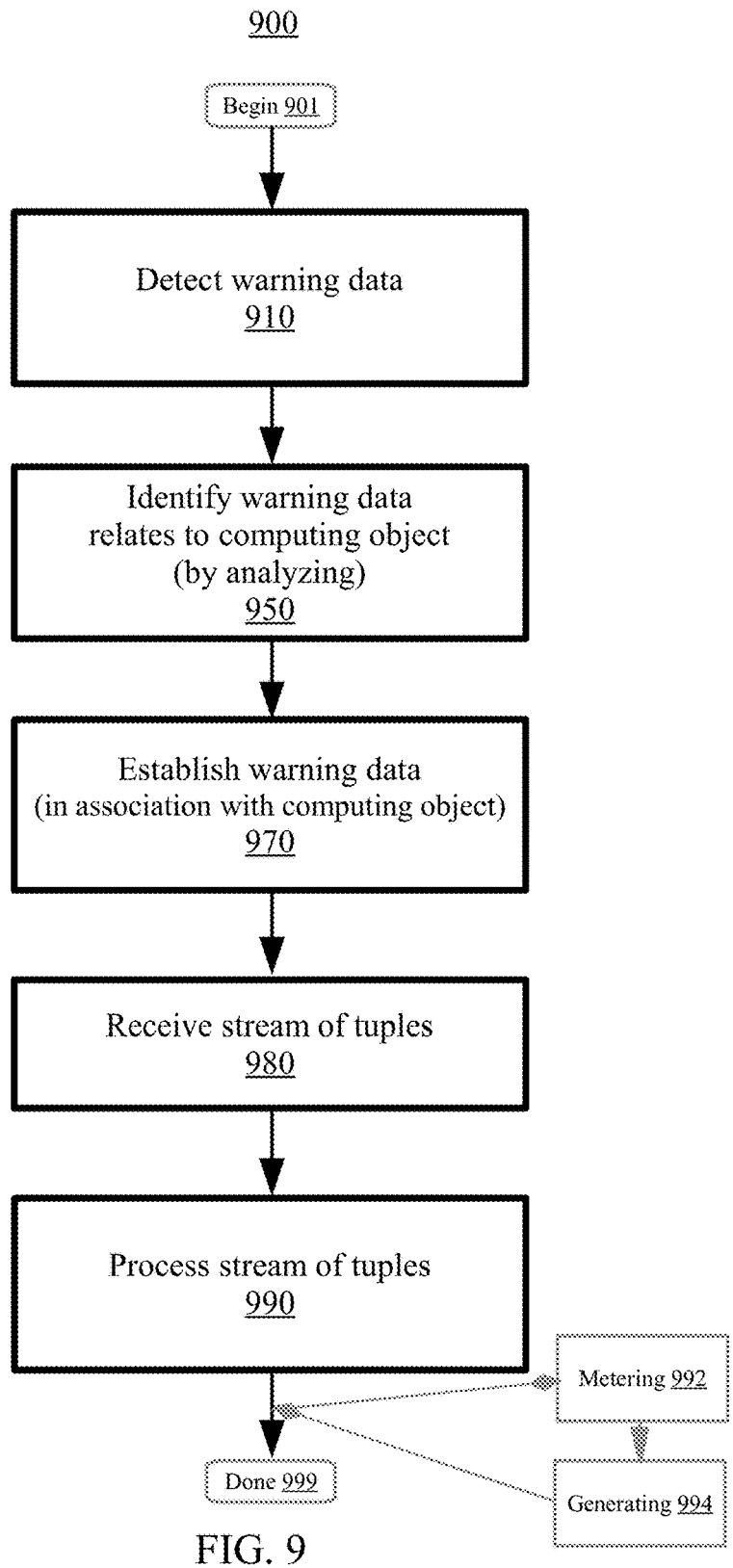
FIG. 9 is a flowchart illustrating a method for managing a data flow in a computing environment, according to embodiments.

FIG. 9 is a flowchart illustrating a method 900 for managing a data flow computing environment, according to embodiments. Aspects of the method 900 may relate to receiving and processing a stream of tuples. The method 900 may begin at block 901. A set of warning data may be detected at block 910. At block 950, it may be determined that the set of warning data relates to a computing object. At block 970, the set of warning data may be established in association with the computing object. Aspects of the method 900 may substantially correspond to other embodiments described herein, including FIGS. 1-19.

At block 980, a stream of tuples is received. The stream of tuples may be processed by a plurality of processing elements (e.g., stream operators) operating on a set of compute nodes (e.g., in a stream application environment). The stream of tuples may be received consistent with the description herein including FIGS. 1-19. Current/future processing by the plurality of processing elements may be performed consistent with the description herein including FIGS. 1-19. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In embodiments, the stream of tuples is processed at block 990. The stream of tuples may be processed by the plurality of processing elements operating on the set of compute nodes. The stream of tuples may be processed consistent with the description herein including FIGS. 1-19. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

In embodiments, use of the warning data may be metered at block 992. Metering can include measuring, tracking, documenting, recording, or calculating the degree or extent of the utilization of the warning data. The degree of utilization may be calculated based on the number of times the warning data was accessed (e.g., 10 times, 100 times), the number of times the warning data was compiled (e.g., in association with the computing object), application configurations (e.g., computer coding configurations, operator arrangements), resource usage (e.g., data processed by streaming applications that include the warning data) or other means. Based on the metered use, an invoice may be generated at block 994. The invoice may include a bill, fee, service charge, or other itemized breakdown specifying compensation for the usage of the set of warning data. Subscription based models are also possible. Method 900 may conclude at block 999.

Figure 10:
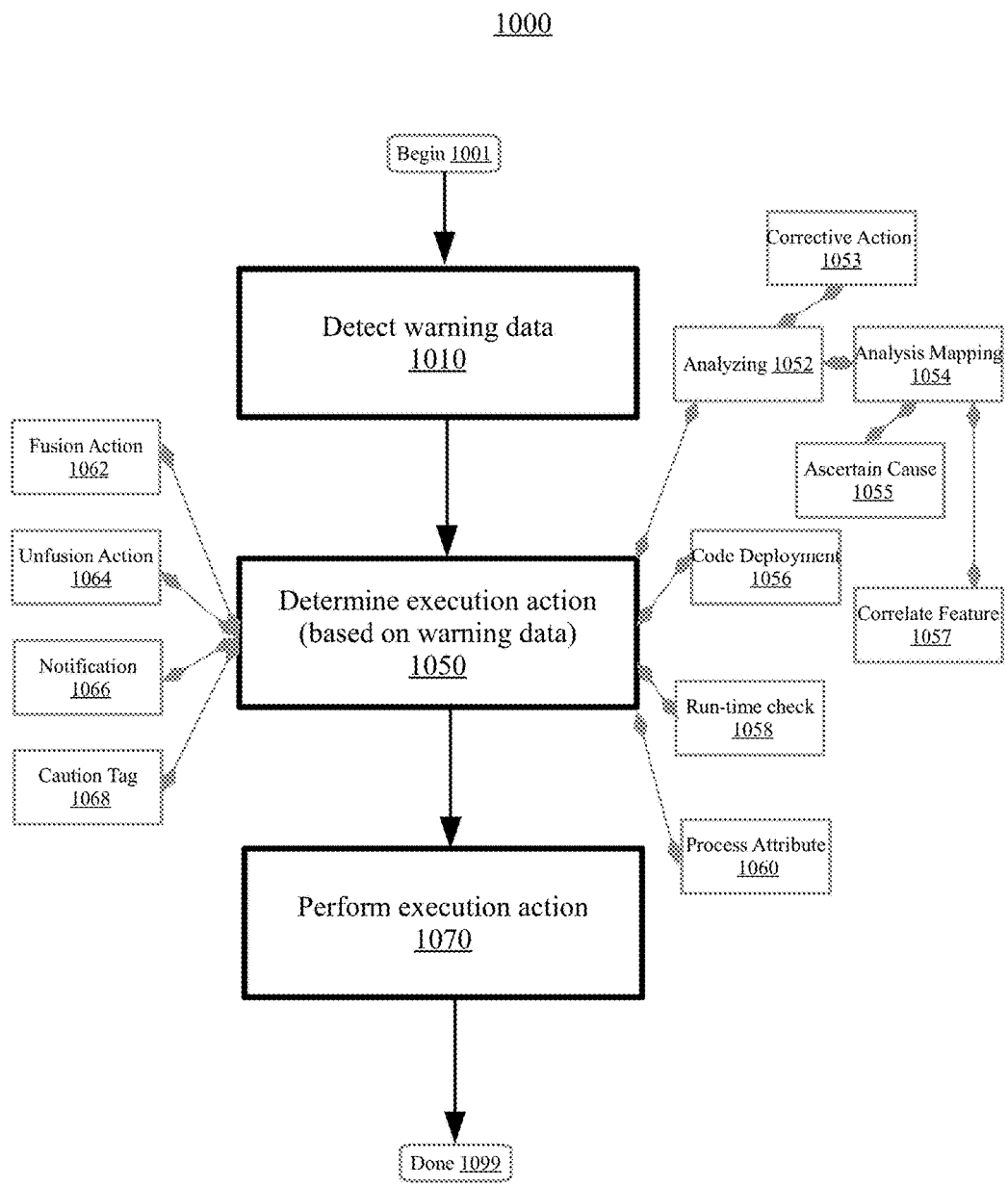
FIG. 10 is a flowchart illustrating a method for managing a set of warning data with respect to an execution phase in a computing environment, according to embodiments.

FIG. 10 is a flowchart illustrating a method 1000 for managing a set of warning data with respect to an execution phase in a computing environment, according to embodiments. In embodiments, the computing environment may include a distributed computing environment or a stream computing environment. The execution phase may generally include the process of initializing and performing the instructions and routines of a computer program by a computer or virtual machine. The execution phase may include using a loader to perform memory setup, shared library linking, and the initiation of software runtime from the entry point of a computer program. The execution phase may include running a compiled computing artifact that includes both a computing object (e.g., source code) and an associated set of warning data (e.g., warning data from a compilation phase or development phase). Aspects of the disclosure relate to utilizing the set of warning data to facilitate the development of various application programs. Method 1000 may begin at block 1001.

At block 1010, the set of warning data may be detected. The set of warning data may be coupled with a computing artifact and be detected with respect to the execution phase (of a code development process). Generally, detecting can include recognizing, sensing, discovering, or otherwise identifying the set of warning data. Detecting may include identifying that a computing artifact (e.g., executable package of compiled programming code) includes a compilation in which the set of warning data is associated with a computing object (e.g., set of programming code). For instance, the compilation may include a batch of source code compiled into an executable program. In embodiments, detecting the set of warning data may include analyzing the computing artifact and identifying a set of warning data that is linked to one or more portions of the computing object. As an example, in certain embodiments, detecting the set of warning data may include parsing the programming code of the computing object (e.g., using a code analysis tool) and determining that one or more locations of the programming code are annotated with tags that indicate associated warning data. Other methods of detecting the set of warning data are also possible.

The set of warning data may include information, notifications, alerts, recommendations, or other forms of data that indicate the presence of a potential error, mistake, irregularity, problem or other issue with respect to the computing object, computing artifact, or computing environment. The set of warning data can include information regarding suggested or recommended actions, discouraged actions, potential incompatibilities, or other information relevant to the code development process or the computing environment. In embodiments, the set of warning data may be detected during the execution phase of the code development process. As an example, in certain embodiments, the set of warning data may be detected during initialization of a set of programming code (e.g., for execution). In certain embodiments, the warning data may be detected at software runtime. For instance, a warning data message may be triggered by activation or execution of a particular computing instruction, and be detected in response. Other methods of detecting the set of warning data are also possible.

At block 1050, an execution action which pertains to the computing artifact may be determined. The execution action may be determined using the set of warning data. Generally, determining can include ascertaining, computing, resolving, or otherwise identifying the execution action based on the set of warning data. In embodiments, determining may include analyzing the computing artifact and ascertaining one or more execution actions which may be associated with positive impacts with respect to the computing artifact. As an example, in response to analyzing the set of warning data of the computing artifact, it may be ascertained that the resource allocation of the host computing environment may result in insufficient memory resources for the computing artifact (e.g., the set of warning data may indicate potential memory bottlenecks). Accordingly, determining the execution action may include reconfiguring the resource allocation of the computing environment to allocate additional memory resources to the computing artifact. Other methods of determining the execution action are also possible.

The execution action may include a task, job, operation, activity, or other process performed with respect to (e.g., during) the compilation phase of the code development process. The execution action may include an operation configured to modify, repair, add, remove, process, assign, allocate, verify, analyze, or otherwise configure an element or feature of the computing artifact. In embodiments, the execution action may include adjusting or revising a portion of the computing artifact in response to occurrence of an issue or problem during execution of the computing instructions included in the computing artifact. In embodiments, the execution action may include configuring one or more processing elements such as operators for a streaming application (e.g., operator fusion, unfusion). In certain embodiments, the execution action may include making asset allocation determinations with respect to the computing artifact (e.g., designating particular portions or aspects of the programming code for deployment on certain host machines).

In embodiments, in response to sensing (e.g., detecting, identifying) an error event which pertains to the computing artifact, the error event may be analyzed at block 1052. Analyzing the error event may include scanning, parsing, inspecting, or otherwise examining the error event to identify information regarding the error (e.g., consequences, triggering conditions, causes, solutions). In embodiments, analyzing the error event may include checking log files associated with the error event or an element of the computing artifact (e.g., processing element, operator). Generally, the error event may include an issue, defect, failure, deficiency, or other unexpected result that occurs in relation to the hardware or software of the computing environment. In embodiments, the error event may occur in relation to the computing artifact. For example, the error event may include a runtime error that indicates that the location of a certain component (e.g., dynamically linked library) necessary for execution of a particular feature of the computing artifact was not specified within the programming code. Accordingly, analyzing the runtime error may include parsing the error event to ascertain the missing component, the location in the programming code where the component should be specified, or other such information. Other methods of analyzing the error event are also possible.

In embodiments, the analysis of the error event may be mapped to the set of warning data at block 1054. Generally, mapping may include linking, associating, relating, or otherwise correlating the analysis of the error event to the set of warning data. In embodiments, mapping the analysis of the error event may include saving data regarding the consequences, triggering conditions, causes, solutions, or other information (e.g., the results of analyzing the error event) along with the set of warning data that corresponds to the error event. As an example, in the case that the error event includes the failure of a particular stream operator, information regarding the cause and reason of the failure (e.g., acquired by analyzing the error event) may be stored along with the set of warning data associated with the error event. In embodiments, one or more code locations related to the operator failure may be correlated to the warning data. Other methods of mapping the analysis of the error event to the set of warning data are also possible.

In embodiments, mapping the analysis of the error event to the set of warning data may include mapping to ascertain a cause of the error event at block 1055. In embodiments, the analysis information mapped to the set of warning data may provide information as to the origin or cause of the error event. Consider the following example. In embodiments, the computing artifact may include a set of warning data (e.g., detected during the compilation phase and associated with the computing object) that indicates that the programming code includes a logic statement that will never be true (e.g., dim x as integer; do while x<5; x=1; x=x+1; loop). In embodiments, during runtime, an error event regarding a stack overflow exception may be detected. In response to analyzing the error event, it may be determined that more methods were called than the memory allocated for executing the computing artifact could handle. Information regarding the results of the analysis of the error event may be mapped to the set of warning data. In embodiments, the analysis of the error event may be used in conjunction with the warning data to ascertain the cause of the error event. For instance, in embodiments it may be determined that the presence of the never-true statement in the programming code (e.g., as indicated by the set of warning data) led to an infinite loop that expended the memory resources allocated for the computing artifact (e.g., the loop will always end in 2 and the loop will never break). Accordingly, the never-true statement in the programming code may be identified as the cause of the error event. In embodiments, a corrective action may be taken to resolve the cause of the error event. Other methods of ascertaining the cause of the error event are also possible.

In embodiments, mapping the analysis of the error event to the set of warning data may include mapping to correlate a feature with one or more of a computing object or a code location at block 1057. The feature may include an aspect, component, characteristic, or element of the error event. In embodiments, correlating the feature may include extracting a particular aspect of the error event and linking it to a portion of a computing object or a line of programming code. The linked code location or computing object may be specifically referenced by the error event or determined to be related to the error event in response to the error event analysis. In certain embodiments, correlating the feature of the error event with the code object may be configured to emphasize or call attention to one or more code locations that are potentially associated with the error event. As an example, in response to detecting an error event related to an arithmetic expression exception (e.g., an error that may be caused by an illegal arithmetic operation), a feature of "arithmetic expression" may be identified, and one or more code locations that include arithmetic expressions or other mathematical functions may be marked or highlighted (e.g., for revision or correction by a user or developer). Other methods of mapping to correlate a feature are also possible.

In embodiments, the execution action may include a corrective action for the error event at block 1053. Generally, the corrective action may include a solution, fix, technique, or other action to mitigate or resolve the error event. In embodiments, the corrective action may include a technique or operation performed based on log files for the error event. As an example, consider the following code segment:

```
class OperateCar( ){
  private Car _car;
  public OperateCar( ){ }
  public void drive( ){
    _car.moveForward(1);
  }}
```

In response to running the above code segment, an error event including a null pointer exception (e.g., an error that may occur when an instance variable in the programming code is called before it is assigned a value) may be detected. Accordingly, in certain embodiments, the corrective action may include revising the programming code to initialize the instance variable that led to the error event. More particularly, the "_car" in the constructor may be revised to "_car=new Car ( );" to initialize the code and alleviate the error event. Other types of corrective actions are also possible.

In embodiments, the execution action may include a code deployment to a set of computing units at block 1056. Generally, the code deployment may include the placement, allocation, or distribution of computing artifacts, computing objects, source code, operators, processing elements, virtual machines, or other assets to the set of computing units. The set of computing units may include one or more different computing systems, containers within a computing system (e.g., virtualized runtime environments), partitions of a computing system (e.g., regions of a storage device with dedicated operating systems), a logical grouping of a computing system (e.g., directories, databases), a physical grouping of a computing system (e.g., host computing device in a distributed network), or other computing environment. In embodiments, the code deployment may include sending the computing artifact to a different computing environment (e.g., for execution) based on the set of warning dating. Aspects of the disclosure, in certain embodiments, relate to the recognition that the set of warning data may indicate a potential incompatibility or other aspect of a host computing environment that may present challenges with respect to operation of the computing artifact (e.g., resource insufficiency, unsupported software functionality). Accordingly, in embodiments, an alternate computing environment may be selected for hosting and execution of the computing artifact. Other methods of code deployment are also possible.

In embodiments, the execution action may include a runtime check modification at block 1058. The runtime check modification may include scanning, revising, editing, annotating, amending, adjusting, or otherwise making a change to the computing artifact at runtime (e.g., at program startup or during operation). The runtime check modification may be based on the set of warning data. In embodiments, the runtime check modification may include adding or removing a logging mechanism. The logging mechanism may include a feature or means configured to manage auditing, fault detection, and coding error identification of the computing artifact. As an example, in certain embodiments the logging mechanism may be enabled to identify potential arithmetic overflows or invalid type casts within the computing artifact. In embodiments, the runtime check modification may include adding or removing an external process. The external process may include a computing instruction, command, operation, or other routine invoked by the computing artifact for execution by another program. For instance, one example of adding an external process may include enabling a system diagnostic monitor or performance analyzer to obtain information regarding the operating performance of the computing artifact. In certain embodiments, the runtime check modification may include adding or removing a product feature. The product feature may include a characteristic, attribute, or other aspect of the computing artifact. In embodiments, removing the product feature may include disabling a particular function (e.g., a visual effect) in order to save hardware resources. Other methods of runtime check modification are also possible.

In embodiments, the execution action may include a process attribute modification at block 1060. Generally, the process attribute modification may include an adjustment, revision, or other change to an element of the computing artifact. In embodiments, the process attribute modification may include adjusting the job priority of one or more tasks of the computing artifact. For example, in a streaming application configured to analyze the performance of a set of stream operators, a job related to gathering performance metrics for the stream operators may be assigned a higher job priority than a job pertaining to tracking the destination location of the processed tuples. In certain embodiments, the process attribute modification may include adjusting the time slice (e.g., the period of time allotted for a process to run) or wait interval (e.g., the length of time the task scheduler is specified to wait for a process to respond) of a particular process of the computing artifact. As an example, in certain embodiments the time slice may be extended to reduce the processing time used by the scheduler. In embodiments, the process attribute modification may include selecting a processing thread for execution of the computing artifact. For instance, in embodiments the available processing threads may be analyzed and a processing thread with bandwidth sufficient to run the computing artifact may be selected. Other methods of process attribute modification are also possible.

In embodiments, the execution action can include an operator fusion action. Generally, operator fusion may include the process of joining or combining a plurality of operators (e.g., streaming operators) together to form a single processing element. Operator fusion may be associated with benefits such as code simplification, processing efficiency, and resource management. In embodiments, a fusion operation corresponding to a plurality of operators may be performed at block 1062. The fusion operation may include fusing one or more operators into a single processing element. As described herein, the fusion action may be based on the set of warning data. For instance, in various embodiments, operators that are associated with the set of warning data may be prevented from fusing with other operators. In embodiments, the nature of the warning data may be analyzed to determine whether fusion between particular operators may be safely and reliably performed. In embodiments, multiple operators associated with warning data may be fused together (e.g., it may be desirable to combine operators to limit the extent of the error in the event of operator failure). As an example, several operators that are associated with deprecated method warnings (e.g., outdated code processes that may no longer be supported by certain machine configurations) may be fused together and executed on an older software version (e.g., that supports the older processes called by the deprecated method). Other methods of selecting operators for operator fusion are also possible.

In embodiments, the execution action can include an operator unfusion action at block 1064. Generally, operator unfusion may include splitting a single processing element composed of multiple operators into individual operators. In embodiments, operator unfusion may be associated with benefits such as reducing operator incompatibilities (e.g., operators that operate normally while separated may cause errors if fused with operator operators), ascertaining the cause of operator failure (e.g., in the event that a processing element including multiple operators fails, it may be difficult to identify which operator was the cause) and the like. As an example, in certain embodiments, an operator may include a failed processing element composed of three individual operators. Due to the failure, the processing element may be unable to perform processing operations. Accordingly, performing the unfusion action to split the processing element may allow two of the operators to resume normal function, while the single operator that was the cause of the error may be identified and corrected. Other methods of performing the operator unfusion action are also possible.

In embodiments, a fusion action notification may be provided at block 1066. The fusion action notification may include an alert, request for verification, or other statement related to the fusion action or the unfusion action. In certain embodiments, the fusion action notification may be provided to a user or developer prior to performance of the fusion action in order to inform the user of the pending operator fusion. For instance, the fusion action notification may request the user's authorization to fuse or unfuse one or more operators associated with warning data. Consider the following example. A particular operator may be associated with a set of warning data that includes the following message: "warning: implicit declaration of function" (e.g., a warning that may occur when a function is used in the code but no previous information regarding the function is found). In embodiments, the compiler may determine (e.g., mistakenly) that the function returns an integer and proceed. In certain scenarios, if the operator associated with this error message is fused with another operator, unexpected software behavior may result (e.g., if the function does not return an integer). Accordingly, prior to performing a fusion action that includes the operator, a fusion action notification may be provided (e.g., to a user). Other types of operator fusion actions and notification actions beyond those described explicitly herein are also possible.

In embodiments, the execution action may include a caution tag at block 1068. Generally, the caution tag may include a label, notice, alert, marker, comment, message, description, or other identifier that indicates that care should be taken with respect to execution of the computing artifact. In embodiments, the caution tag may be inserted into the computing artifact at a certain code location such that it is displayed or presented (e.g., to a user/developer) when the code at the marked code location is executed. As an example, in certain embodiments, the caution tag may be inserted at a code location that corresponds to a potentially uninitialized variable. Accordingly, when the code location is called, the caution tag may be displayed to the user or developer to indicate that unpredicted behavior may result. Other types of caution tags and methods of using cautions tags are also possible.

At block 1070, the execution action may be performed. As described herein, the execution action may pertain to the computing artifact. Generally, performing may include running, executing, implementing, enacting, carrying out, or otherwise putting the execution action into operation (e.g., the execution action determined at block 1050). In embodiments, performing the execution action may include selecting a performance configuration for the execution action. The performance configuration may include an arrangement of software and hardware resources to facilitate implementation of the execution action. In embodiments, the performance configuration may include deploying the execution action to a particular computing environment (e.g., virtual machine, physical compute node), allocating resources for performance of the execution action, scheduling the execution action in a job scheduler (e.g., choosing an execution time, frequency), or configuring other aspects of the computing environment for performance of the execution action based on the nature of the execution action and the set of warning data. Other methods of performing the execution action are also possible.

Method 1000 concludes at block 1099. Aspects of method 1000 may provide performance or efficiency benefits for warning data management. For example, aspects of method 1000 may have positive impacts with respect to development of a streaming application. As described herein, the detecting, determining, and performing described herein may each occur in an automated fashion without user invention. Altogether, determination and performance of an execution action based on detected warning data may be associated with performance or efficiency benefits (e.g., development speed, error elimination, computing resource efficiency).

Figure 11:
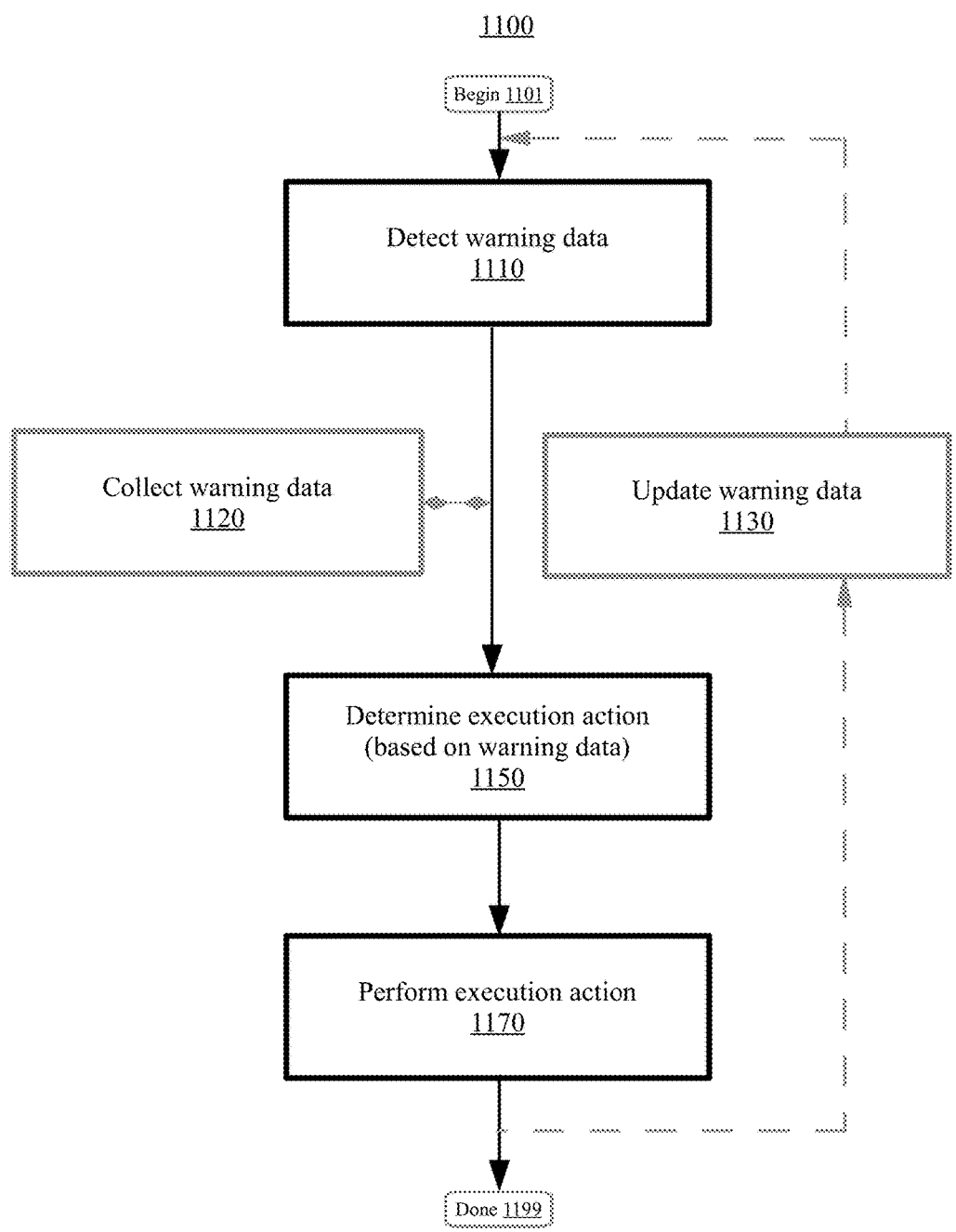
FIG. 11 is a flowchart illustrating a method for managing a set of warning data with respect to an execution phase in a computing environment, according to embodiments.

FIG. 11 is a flowchart illustrating a method 1100 for managing a set of warning data with respect to an execution phase in a computing environment, according to embodiments. Aspects of the method 1100 may relate to collecting or updating a set of warning data. The method 1100 may begin at block 1101. At block 1110, the set of warning data may be detected. The set of warning data may be collected at block 1120. The set of warning data may be updated at block 1130. At block 1150, an execution action may be determined based on the warning data. At block 1170, the execution action may be performed. Aspects of the method 1100 may substantially correspond to other embodiments described herein, including FIGS. 1-19.

In embodiments, the set of warning data may be collected at block 1120. Generally, collecting can include capturing, gathering, aggregating, maintaining, or storing. In embodiments, collecting the set of warning data may include identifying warning data that occurs during execution of the computing artifact (e.g., runtime) and saving it in association with the computing artifact. The collected warning data may be saved internally (e.g., within the same data file that includes the computing artifact) or externally (e.g., in a separate file linked with the computing artifact.) Aspects of the disclosure, in embodiments, relate to collecting the set of warning data in response to just-in-time (JIT) compilation. Generally, JIT compilation may include code compilation performed with respect to (e.g., during) execution of the computing artifact (e.g., at runtime). JIT compilation may be associated with faster execution than static compilation processes. In certain embodiments, JIT compilation may be used to compile expressions that correspond to data that is provided at runtime. As an example, collecting the set of warning data may include performing JIT compilation on a regular expression (e.g., a code sequence for pattern-matching that is provided at runtime), and storing a set of warning data that occurs in response to the JIT compilation. In embodiments, aspects of the disclosure relate to the recognition that some programming languages may be interpreted at run time. Accordingly, in certain embodiments, collecting the set of warning data may include gathering warning messages during runtime interpreting or processing of the computing artifact. Other examples of collecting the set of warning data are also possible.

In embodiments, the set of warning data may be updated at block 1130. Generally, updating the set of warning data may include modifying, revising, editing, adding data, subtracting data, or otherwise making a change to the set of warning data (e.g., existing warning data stored in association with the computing object). In embodiments, updating the set of warning data may be performed in response to performing the execution action. For instance, information or data regarding the set of warning data (e.g., additional warning data, results of the execution action, suggested follow-up actions, feedback data) may be generated in response to performance of the execution action, and this data may be collected and added to the set of warning data. Consider the following example. In response to performing an execution operation that includes operator fusion of one or more operators associated with warning data, performance diagnostics may be run to evaluate the performance of the fused operator (e.g., stability, compatibility of the fused operators, data processing characteristics). Data pertaining to the performance of the fused operator may be aggregated and included in the set of warning data corresponding to the fused operators. In embodiments, subsequent execution actions may be based on the updated set of warning data (e.g., a fusion operation between operators with a first type of warning data was successful and may be repeated, while a fusion operation between operators with a second type of warning data led to instability and may be avoided). In certain embodiments, updating the set of warning data may include adding additional warning data that occurred in response to JIT compilation. Other methods of updating the set of warning data are also possible.

Method 1100 concludes at block 1199. Aspects of method 1100 may provide performance or efficiency benefits for warning data management. For example, aspects of method 1100 may have positive impacts with respect to management (e.g., collecting, updating) of a set of warning data. The steps or operations described herein may each occur in an automated fashion without user invention. Altogether, leveraging the information provided by execution phase warning messages may be associated with performance or efficiency benefits (e.g., development speed, error elimination, computing resource efficiency).

Figure 12:
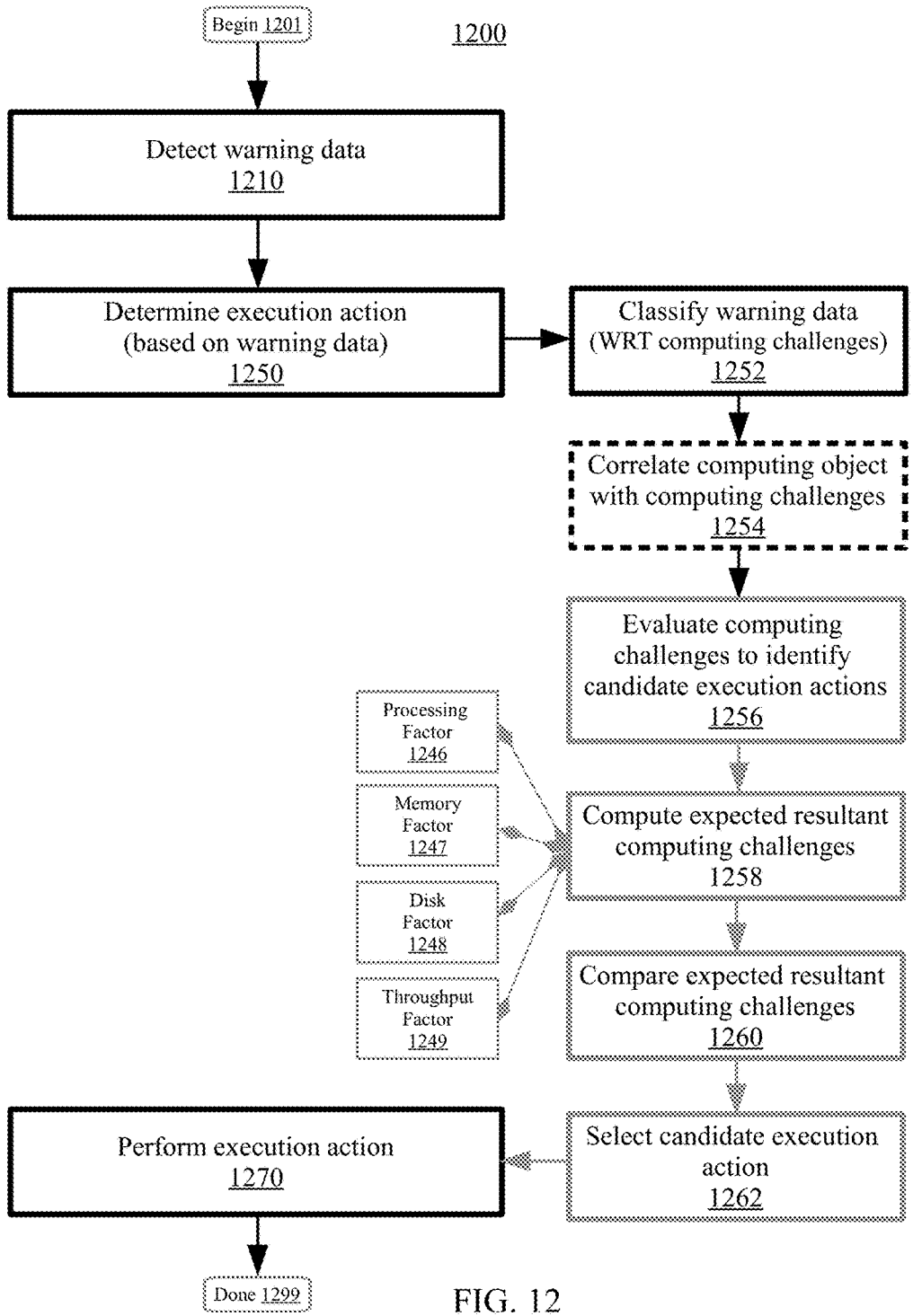
FIG. 12 is a flowchart illustrating a method for managing a set of warning data with respect to an execution phase in a computing environment, according to embodiments.

FIG. 12 is a flowchart illustrating a method 1200 for managing a set of warning data with respect to an execution phase in a computing environment, according to embodiments. Aspects of the method 1200 may relate to a set of computing challenges. The method 1200 may begin at block 1201. A set of warning data may be detected at block 1210.

At block 1250, an execution action may be determined based on the set of warning data. At block 1270, the execution action may be performed. Aspects of the method 1200 may substantially correspond to other embodiments described herein, including FIGS. 1-19.

In embodiments, the set of warning data may be classified with respect to a set of computing challenges at block 1252. Classifying can include categorizing, organizing, mapping, arranging, or grouping the set of warning data. In embodiments, the set of warning data may be classified with respect to a set of computing challenges. Generally, the computing challenges can include computing performance, virtual machine management, computing resource demands, software instability, software incompatibilities, power management, or the like. In certain embodiments, the computing challenges may relate to stream operator performance in a streaming application. As examples, the computing challenges may include issues related to the management of throughput rate, processing resources, memory resources, and storage resources utilized by a set of streaming operators deployed in a streaming application. As described herein, the set of warning data may be classified with respect to the set of computing challenges. In embodiments, classifying the warning data may include sorting the warning data into groups of related computing challenges. For example, a first set of warning data that indicates possible impacts to the throughput rate may be sorted into a first group of computing challenges related to throughput rate issues, while a second set of warning data that indicates a potential influence to the processing resource utilization of one or more operators may be sorted into a second group of computing challenges related to processor resource utilization issues. Other methods of classifying the set of computing challenges are also possible.

In embodiments, the set of computing challenges may be correlated with the computing object at block 1254. Generally, correlating can include linking, relating, associating, or otherwise connecting the set of computing challenges with the computing object. In embodiments, correlating the computing challenges with the computing object may include linking one or more computing challenges with one or more portions of the programming code included in the computing object. For instance, correlating may include annotating a line of code or other code location of the computing object with a computing challenge tag that indicates a relation to a particular computing challenge. Consider the following example. A first code location of the computing object may include a function that defines the amount of processing resources allocated to a particular stream operator. In embodiments, the amount of processing resources defined by the function for allocation to a particular stream operator may limit the throughput rate achievable by the stream operator such that occurrence of a stream flow bottleneck is predicted. Accordingly, the first code location may be annotated with a computing challenge tag that indicates a relation to stream operator throughput issues. Other methods of correlating the set of computing challenges with the computing object are also possible.

In embodiments, the set of computing challenges may be evaluated at block 1256. The set of computing challenges may be evaluated to identify a set of candidate execution actions. The set of candidate execution actions may include both a first candidate execution action and a second candidate execution action. Generally, evaluating can include analyzing, examining, or inspecting. In embodiments, evaluating the set of computing challenges may include examining the set of warning data and the computing object associated with a particular computing challenge to identify the first and second candidate execution actions. In certain embodiments, evaluating the set of computing challenges to identify the set of candidate execution actions may include analyzing aggregated historical information and archived data associated with the set of warning data (e.g., profile information, historical performance metrics). As described herein, the first and second candidate execution actions may include tasks, jobs, operations, activities, or other processes performed during the compilation phase of the code development process. In embodiments, the first and second candidate execution actions may include suggested solutions or other corrective measures recommended to positively impact the computing challenges (e.g., solutions or actions that were used in the past to reduce similar computing challenges, as indicated by historical utilization and performance data). As examples, the candidate execution actions may include operator fusion actions, fusion action notifications, parameter adjustments, code debugging, operator replacement, or other processes. Other methods of evaluating the computing challenges to identify the candidate execution actions are also possible.

In embodiments, one or more expected resultant computing challenges may be computed at block 1258. The expected resultant computing challenges may include a first expected resultant computing challenge for the first candidate execution action and a second expected resultant computing challenge for the second candidate execution action. Generally, computing may include calculating, determining, appraising, evaluating, or otherwise ascertaining the expected resultant computing challenges. In embodiments, computing the expected resultant computing challenges may include analyzing archived utilization records and historical performance data to calculate a predicted or estimated outcome of a particular execution action. In embodiments, the expected resultant computing challenges may include a set of values or other quantitative indications of the anticipated result of the execution action. The set of values may correspond to one or more of a processing utilization factor (e.g., central processing unit resources usage) at block 1246, a memory utilization factor (e.g., random access memory resources usage) at block 1247, a disk utilization factor (e.g., persistent storage resources usage) at block 1248, or a throughput factor (e.g., network bandwidth resources) at block 1249. As an example, for a candidate execution action that includes a parameter adjustment to a function that defines the amount of memory resources allocated for use by a particular operator graph, an expected resultant value that indicates a maximum recommended number of operators may be computed. For example, if the total memory allocated for use by the operator graph is 6 gigabytes and an average operator requires 2 gigabytes for smooth operation, a recommended operator amount of 3 operators may be computed for the candidate execution action. Other methods of computing the expected resultant computing challenge are also possible.

In embodiments, a plurality of expected resultant computing challenges may be compared at block 1260. As described herein, aspects of the disclosure relate to comparing a first expected resultant computing challenge corresponding to a first candidate execution action with a second expected resultant computing challenge corresponding to a second candidate execution action. Generally, comparing the expected resultant computing challenges may include contrasting, correlating, juxtaposing, matching, evaluating, or otherwise examining the expected resultant computing challenges with respect to each other. In embodiments, comparing the first and second expected resultant computing challenges may include separately modeling the predicted performance behavior that may result from executing the first candidate execution action and the second execution action. As an example, performance metrics including graphs and charts illustrating expected resource utilization and data flow (e.g., tuple throughput) may be generated for multiple scenarios (e.g., a first scenario based on the first expected resultant computing challenge and a second scenario based on the second expected resultant computing challenge.) Other methods of comparing the first and second expected resultant computing challenges are also possible.

In embodiments, a candidate execution action may be selected at block 1262. Selecting a candidate execution action may include selecting one of the candidate execution actions corresponding to the expected resultant computing challenges compared at block 1260 (e.g., the first or second candidate execution action). Generally, selecting can include choosing, electing, deciding, picking, ascertaining, or otherwise determining the candidate execution action. The selected candidate execution action may be performed, added to a command queue for scheduling, or provided to a user for authentication. Selecting can include, for example, storing a data value (e.g., entering a digit/character in a database), transmitting a data object (e.g., sending an object having metadata), routing a message (e.g., publishing a startup expectation), or providing/performing/processing an operation (e.g., a notification). In embodiments, selecting the candidate execution action may be based on determining that one of the expected resultant computing challenges (e.g., the first expected resultant computing challenge) exceeds one or more other expected resultant computing challenges (e.g., the second expected resultant computing challenge). For instance, referring to the example described above, the performance behavior models and other performance metrics for each of the expected resultant computing challenges may be analyzed, and an expected resultant computing challenge that leads to a desirable performance outcome (e.g., resource usage efficiency, faster data processing speed) may be determined. Accordingly, the candidate execution action corresponding to the determined expected resultant computing challenge may be selected. Other methods of selecting the candidate execution action are also possible.

Method 1200 concludes at block 1299. Aspects of method 1200 may provide performance or efficiency benefits for warning data management. For example, aspects of method 1200 may have positive impacts with respect to management of a set of computing challenges and candidate execution actions associated with a set of warning data. As described herein, the steps or operations described herein may each occur in an automated fashion without user invention. Altogether, leveraging the information provided by warning messages may be associated with performance or efficiency benefits (e.g., development speed, error elimination, computing resource efficiency).

Figure 13:
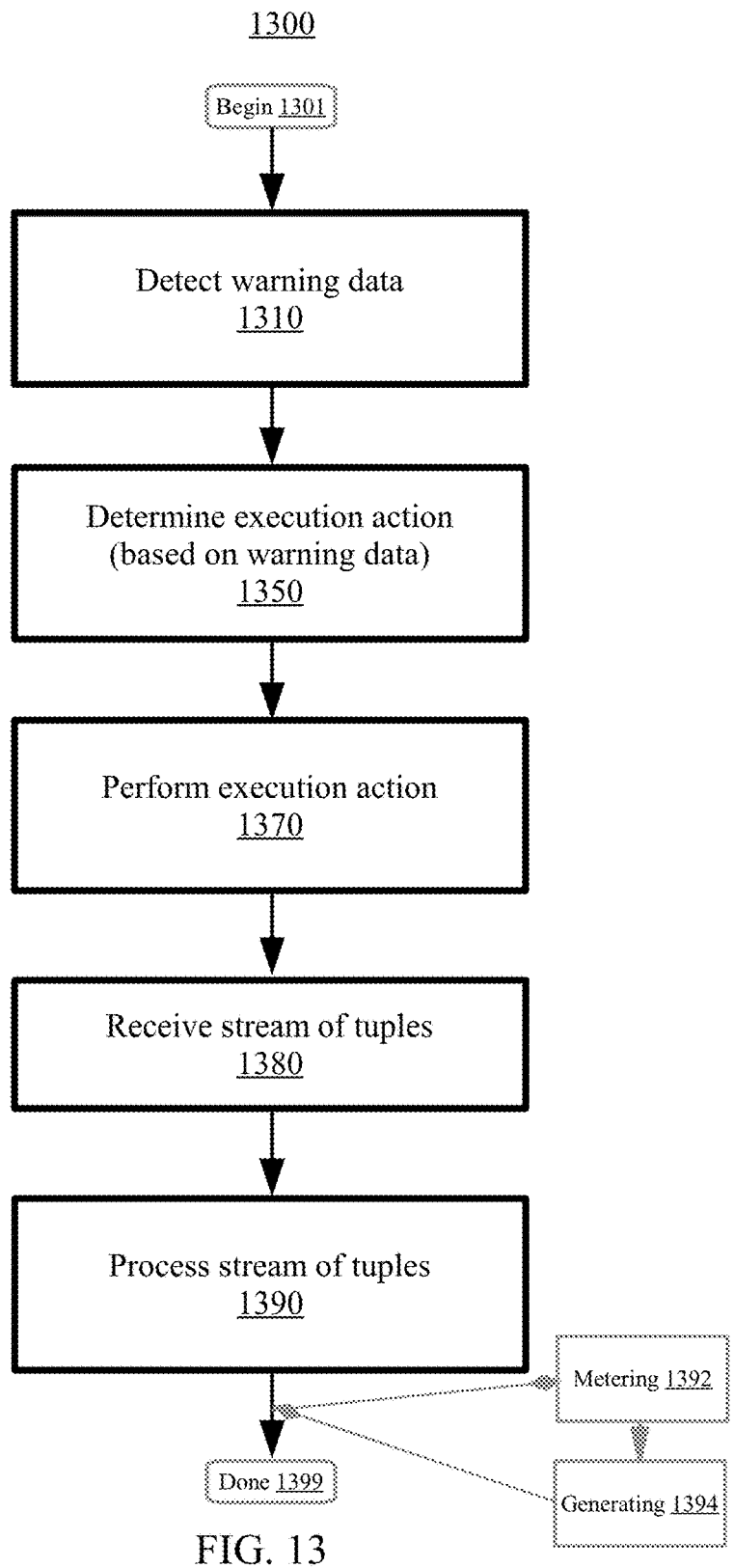
FIG. 13 is a flowchart illustrating a method for managing a data flow in a computing environment, according to embodiments.

FIG. 13 is a flowchart illustrating a method 1300 for managing a data flow in a computing environment, according to embodiments. Aspects of the method 1300 may relate to receiving and processing a stream of tuples. The method 1300 may begin at block 1301. A set of warning data may be detected at block 1310. At block 1350, an execution action may be determined based on the set of warning data. At block 1370, the execution action may be performed. Aspects of the method 1300 may substantially correspond to other embodiments described herein, including FIGS. 1-19.

At block 1380, a stream of tuples is received. The stream of tuples may be processed by a plurality of processing elements (e.g., stream operators) operating on a set of compute nodes (e.g., in a stream application environment). The stream of tuples may be received consistent with the description herein including FIGS. 1-19. Current/future processing by the plurality of processing elements may be performed consistent with the description herein including FIGS. 1-19. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In embodiments, the stream of tuples is processed at block 1390. The stream of tuples may be processed by the plurality of processing elements operating on the set of compute nodes. The stream of tuples may be processed consistent with the description herein including FIGS. 1-19. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

In embodiments, use of the warning data may be metered at block 1392. Metering can include measuring, tracking, documenting, recording, or calculating the degree or extent of the utilization of the warning data. The degree of utilization may be calculated based on the number of times the warning data was accessed (e.g., 10 times, 100 times), the number of times the warning data was compiled (e.g., in association with the computing object), resource usage (e.g., data processed by streaming applications that include the warning data) or other means. Based on the metered use, an invoice may be generated at block 1394. The invoice may include a bill, fee, service charge, or other itemized breakdown specifying compensation for the usage of the set of warning data. Subscription based models are also possible. Method 1300 may conclude at block 1399.

Figure 14:
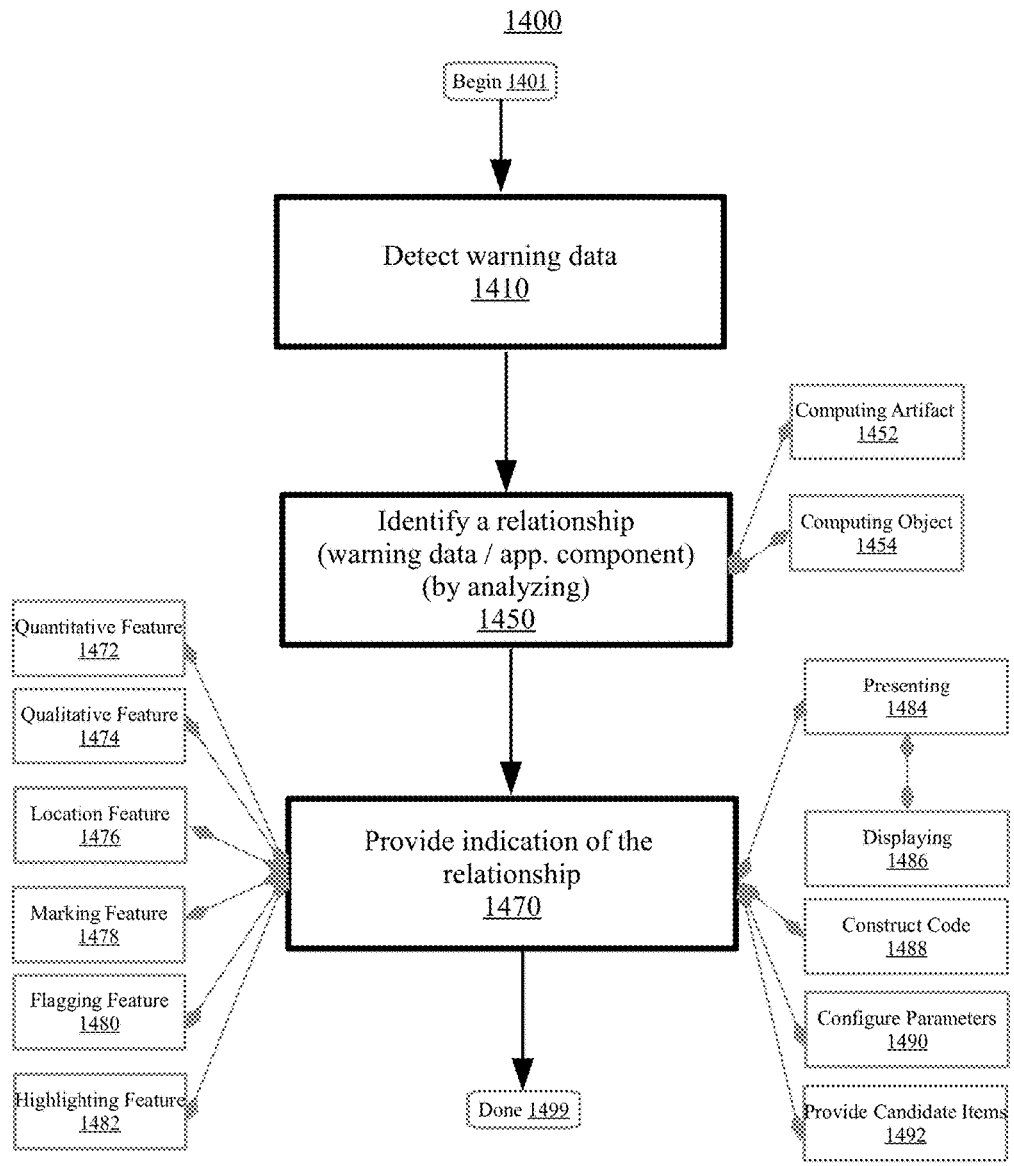
FIG. 14 is a flowchart illustrating a method for managing a set of warning data with respect to a development phase in a computing environment, according to embodiments.

FIG. 14 is a flowchart illustrating a method 1400 for managing a set of warning data with respect to a development phase in a computing environment, according to embodiments. In embodiments, the computing environment may include a distributed computing environment or a stream computing environment. The development phase may generally include the processes of modifying, authoring, debugging, compiling, deploying, and performing other programming related tasks in an integrated development environment (IDE). The integrated development environment may include a visual programming interface providing a variety of tools for development of a software application. In embodiments, the programming tools of the IDE may be used by a user or software developer to advance development of a software application (e.g., a streaming application). Aspects of the development phase relate to utilizing a set of warning data to facilitate the development of various application programs. Method 1400 may begin at block 1401.

At block 1410, the set of warning data may be detected. The set of warning data may be coupled with a computing artifact and be detected with respect to the development phase (of a code development process) of an application. The application may include a software program, package, executable file, or the like. Generally, detecting can include ascertaining, recognizing, discovering, discerning, or otherwise identifying the set of warning data. Detecting may include identifying that a computing artifact (e.g., executable package of compiled programming code) includes a compilation in which the set of warning data is associated with a computing object (e.g., set of programming code). In embodiments, the compilation may include a batch of source code compiled into an executable program. In embodiments, detecting the set of warning data may include analyzing the computing artifact and identifying a set of warning data that is linked to one or more portions of the computing object. As an example, in certain embodiments, detecting the set of warning data may include parsing the programming code of the computing object (e.g., using a code analysis tool) and determining that one or more locations of the programming code are annotated with tags that indicate associated warning data. Other methods of detecting the set of warning data are also possible.

The set of warning data may include information, notifications, alerts, recommendations, or other forms of data that indicate the presence of a potential error, mistake, irregularity, problem or other issue with respect to the computing environment. The set of warning data may include information regarding suggested or recommended actions, discouraged actions, potential incompatibilities, or other information relevant to the code development process or the computing environment. In embodiments, the set of warning data may be detected with respect to (e.g., during) a development phase related to code compilation or execution. As an example, in certain embodiments, the set of warning data may be detected with respect to (e.g., during) development of a software application. In certain embodiments, the warning data may be detected in an integrated development environment (IDE). Other methods of detecting the set of warning data are also possible.

Consider the following example. An IDE may be used to create an operator graph in relation to a streaming application. The operator graph may include a number of operators, processing elements, and other components to model the processing flow of a stream of tuples. In embodiments, the IDE may be configured to import additional operators from external sources for use in the operator graph. Accordingly, in certain embodiments, in response to importing one or more operators from an external source, the IDE may analyze the imported operators to detect whether warning data is associated with them. Warning data which is detected by the IDE may be collected and saved along with the programming code (e.g., computing object, computing artifact) for the software application being developed. Other methods of detecting the set of warning data are also possible.

At block 1450, a relationship between the set of warning data and a component of the application may be identified. The relationship may be identified based on analyzing the set of warning data. Generally, identifying can include resolving, discovering, ascertaining, recognizing, comparing, matching, or otherwise determining a link, correlation, or correspondence between the set of warning data and the component of the application. In embodiments, the component of the application may include a computing object (e.g., a portion of implementation code or code location) at block 1454, a computing artifact (e.g., compiled executable) at block 1452, an operator (e.g., stream operator), processing element, or other aspect of the application. In embodiments, identifying the relationship between the set of warning data and the component of the application may include determining that the set of warning data references, calls out, or otherwise indicates a particular portion or location of the computing object. Identifying the relationship may include ascertaining how the set of warning data is linked to the component of the application. Other methods of identifying the relationship are also possible.

In embodiments, the relationship between the set of warning data and the component of the application may be identified based on analyzing the set of warning data. Analyzing the set of warning data may include parsing the warning data or metadata pertaining to the warning data to determine the nature of the relationship between the set of warning data and the computing object. Consider the following example. A streaming application corresponding to a computing object (e.g., set of programming code) may be under development in an integrated development environment. The computing object may be associated with a set of warning data. In embodiments, the IDE may include a variety of stream operators for use in the construction of an operator graph. Aspects of the disclosure relate to parsing the set of warning data to identify a subset of the stream operators that are associated with one or more portions of the warning data. In response to parsing the set of warning data, identifying the relationship between the set of the warning data and the component of the application (e.g., the operator) may include determining that a portion of the computing object that governs the behavior of split operators is associated with warning data (e.g., the syntax for the user identified split condition may be unrecognized). Other methods of analyzing the set of warning data to identify the relationship between the warning data and the component of the application are also possible.

At block 1470, an indication of the relationship between the set of warning data and the component of the application may be provided. The indication of the relationship may be provided for utilization to develop the application. Generally, providing can include presenting, displaying, supplying, demonstrating, or otherwise conveying information. In certain embodiments, providing an indication of the relationship may include implementing a visual representation of the nature of the relationship. For instance, a marking, sign, or other expression representing the relationship between the set of warning data and the component of the application may be added within the integrated virtual development environment. In certain embodiments, providing may include notifying a user or developer of the nature of the relationship between the set of warning data and the component of the application. Other methods of providing an indication of the relationship are also possible.

In embodiments, providing an indication of the relationship may include providing a quantitative feature at block 1472. The quantitative feature of the relationship may indicate a number of warnings. Generally, the quantitative feature may include a measurable or quantifiable representation of the relationship between the set of warning data and the component of the application. For instance, the quantitative feature may include a tag or annotation that indicates the number of warning messages associated with a particular component. As an example, in embodiments a split operator may be associated with five warning messages. In certain embodiments, the quantitative feature may include a quantitative indication of the relative impact (e.g., severity) of a particular component of the application. As an example, the quantitative feature may be expressed as an integer value between 0 and 100, wherein lesser values represent a lesser degree of impact and greater values represent a greater degree of impact. Other types of quantitative feature are also possible.

In embodiments, providing an indication of the relationship may include providing a qualitative feature at block 1474. The qualitative feature of the relationship may indicate a type of warning. Generally, the qualitative feature may include a relative, subjective or conditional representation of the relationship between the set of warning data and the component of the application. In embodiments, the qualitative feature may relate to the nature or classification of the relationship. For instance, as described herein, the qualitative feature may include a tag or description that characterizes the type of the warning data. As an example, the qualitative feature may include a notification or message that a particular component is associated with a syntax category error. As another example, another component may include a notification that indicates that it is associated with a deprecated method category error. In certain embodiments, the qualitative feature may indicate one or more computing challenges associated with the set of warning data. For example, the qualitative feature for a certain component may indicate that it is associated with a memory insufficiency, a throughput bottleneck, or the like. Other types of qualitative features are also possible.

In embodiments, providing an indication of the relationship may include providing a location feature at block 1476. The location feature of the relationship may indicate a warning position. Generally, the location feature may include a positional representation of the relationship between the set of warning data and the component of the application. In embodiments, the location feature may include a warning position that specifies the source or origin of the set of warning data. For instance, in certain embodiments the location feature may designate a location in the computing artifact (e.g., programming code) that triggered the occurrence of the set of warning data. As an example, the location feature may include a notification or tag (e.g., attached to an operator or other component) that specifies a line of code (e.g., line 51) block of code, function, expression, or other portion of the programming code that is associated with the set of warning data. Other types of location feature are also possible.

In embodiments, providing an indication of the relationship may include providing a marking feature at block 1478. The marking feature may be configured to facilitate a filter operation. Generally, the marking feature may include a marker, tag, annotation, or other identifier. In embodiments, the marking feature may be used to identify a particular component of the application as a member of a category, classification, or group. For instance, one type of marking feature may be used to select those components that are associated with similar types of warning data. As an example, the components that are associated with syntax category warning data may be assigned a first marker (e.g., a blue asterisk), while the components that are associated with uninitialized variable category warning data may be assigned a second marker (e.g., a red triangle). In embodiments, aspects of the disclosure relate to sorting or organizing the components of the IDE based on the marking feature. For instance, the components of the IDE may be filtered based on the marking feature. As an example, an operator graph may be filtered to display those operators with a particular type of warning data by adjusting a filter condition to specify a desired type of marking feature (e.g., display all operators with red triangles, filter out operators with blue asterisks). Other types of marking features are also possible.

In embodiments, providing an indication of the relationship may include providing a flagging feature at block 1480. The flagging feature may be configured to facilitate a selection operation. Generally, the flagging feature may include a flag, tag, annotation, or other identifier. In embodiments, the flagging feature may be used call attention to, emphasize, prioritize, or accentuate a particular component of the application. For instance, the flagging feature may be used to call attention to a component or group of components associated with a particular set of warning data. As an example, the flagging feature may be used to alert a user or developer that a certain class or type of warning is associated with a high risk level, and corrective measures are recommended. In certain embodiments, aspects of the disclosure relate to using the flagging feature to facilitate a selection operation. The selection operation may include identifying one or more components as targets for a particular action. For example, the selection operation may include selecting the flagged operators in an operator graph as targets of a corrective action. Accordingly, the corrective action may be performed with respect to all the flagged components selected as part of the selection operation. Other types and uses of the flagging feature are also possible.

In embodiments, providing an indication of the relationship may include providing a highlighting feature at block 1482. The highlighting feature may be configured to differentiate the indication. Generally, the highlighting feature may include a color modification, visual effect, tag, annotation, or other identifier. In embodiments, the highlighting feature may be used to distinguish, separate, individuate, characterize, or emphasize a particular component of the application. For instance, the highlighting feature may be used to make a visual distinction between components of the same type, different types of warning data, or those components associated with warning data and those that are not. As an example, an operator graph may include four custom operators that are all associated with the same type of warning data (e.g., uninitialized variables). Each custom operator may have a different specified logic parameter, and be configured to perform a different function. Based on the unique specified logic parameters for each operator, one or more custom operators of the group may be determined to be unsafe to be included in operator fusion actions, while one or more other custom operators of the group may be safely fused. Accordingly, the highlighting feature may be used to differentiate those operators that are safe for fusion from those that are not. Other types and uses for the highlighting feature are also possible.

In embodiments, a group of features of the relationship between the set of warning data and the component of the application may be presented at block 1484. The group of features of the relationship may be presented in an integrated development environment. Presenting may include conveying or communicating the group of features using one or more of a variety of mediums (e.g., still images, text, video). Generally, the group of features may include characteristics, traits, or other attributes that define the relationship between the set of warning data and the component of the application. As examples, the group of features may include textual summaries describing how the set of warning data affects one or more components of the application, predicted performance impacts of the warning data on the application, evaluations of the relative severity of the warning data on the component of the application, and the like. In embodiments, presenting may include disclosing or expressing the group of features within an IDE. Other methods of presenting the set of warning data area also possible.

In embodiments, the group of features may be displayed at block 1486. The group of features may be displayed within an operator graph of the application. Generally, displaying may include providing a visual representation of the group of features. As described herein, in certain embodiments, displaying may include providing a visual illustration, demonstration, or explanation of the group of features within an operator graph of the application. As an example, consider an application that includes an operator graph having a variety of stream operators (e.g., filter operators, split operators, join operators, sort operators). In embodiments, one or more operators may be associated with a set of warning data. For instance, a sort operator (e.g., an operator configured to order tuples based on a user-specified ordering expression) may be associated with a set of warning data that indicates one or more uninitialized variables present in the ordering expression. Accordingly, in response to a sort operator being placed within the operator graph, displaying the group of features may include providing a pop-up error message that describes the nature of the warning data. Displaying the group of features may also include generating a simulation of the data flow through the operator graph to illustrate the impact that the malfunctioning sort operator may have. Other methods of displaying the group of features are also possible.

In embodiments, implementation code may be constructed at block 1488. The implementation code may be constructed to facilitate development of the application. Constructing implementation code may include generating, building, editing, modifying, or revising portions of programming code (e.g., of the computing artifact) for the application. The implementation code may include lines or blocks of code corresponding to stream operators, error/bug corrections, suggested features, performance improvements, resource usage efficiency or the like. In embodiments, constructing the implementation code may be based on the set of warning data, and provide an indication of the relationship between the set of warning data and the component of the application. For instance, constructing the implementation code may include adding programming code configured to perform one or more functions determined by analyzing the set of warning data. As an example, in a streaming application configuration that includes a pair operator (e.g., an operator configured to pair tuples from two or more streams) that is associated with a set of warning data, constructing the implementation code may include editing the programming code of the computing object to replace the pair operator with a join operator (e.g., an operator that can carry out a similar tuple joining function) to avoid potentially unpredictable behavior of the pair operator. In embodiments, the constructed code may be suggested to a user/developer of the streaming application for verification before implementation. In various embodiments, a notification message may be displayed informing a user or developer of the modification to the programming code and the reason for the change. Other methods of constructing implementation code are also possible.

In embodiments, developing the streaming application includes configuring a set of parameters at block 1490. Configuring the set of parameters may include modifying, editing, or otherwise adjusting one or more settings or parameters of the streaming application. In embodiments, configuring parameters may include adjusting the resources allocated to a particular stream operator, changing the settings or instructions for a stream operator, or the like. Configuring the set of parameters may be based on an analysis of the set of warning data. As an example, a filter operator may be configured to remove tuples from a stream by passing along only those tuples that satisfy a parameter specified in the programming code of the computing artifact (e.g., only pass tuples that are greater than 1000 bytes of data). In embodiments, the filter operator may be associated with a set of warning data that indicates that the value defined for the filter parameter is invalid (e.g., does not fall within a certain range). Accordingly, in embodiments, configuring the parameters may include revising the filter parameter to a valid value. As another example, in certain embodiments configuring the parameters may include running one or more algorithms (e.g., configuration optimization algorithms, performance testing algorithms) with respect to the streaming application. For instance, an algorithm may be run to calculate the minimum amount of processing resources needed to maintain a certain throughput rate for a given operator configuration, and then editing the operators of the streaming application based on the results of the calculation. Other methods of configuring the parameters are also possible.

In embodiments, a set of candidate items may be provided at block 1492. The candidate items may be provided to facilitate development of the application. In embodiments, providing the candidate items may include presenting an array including one or more potential objects, components, or other elements for inclusion in the computing artifact or the application. For instance, providing the candidate items may include displaying a list of one or more suggested features, tools, code modifications, or other processes to aid development of the application. In embodiments, the list of candidate items may be provided within an integrated development environment. As an example, the list of candidate items may include suggesting recommended processing elements, code revisions, debugging processes, and other tools for a user's verification and selection. Other methods of providing the candidate items are also possible.

In embodiments, the set of candidate items provided in the list may be based on the configuration of the application, the computing artifact, and the set of warning data. Consider the following example. In certain embodiments, an application in development in an IDE may correspond to a computing artifact associated with a set of warning data that indicates the presence of one or more deprecated methods (e.g., outdated code processes that may no longer be supported by certain machine configurations). Accordingly, the set of candidate items may include options such as alternative code suggestions (e.g., up-to-date methods or functions supported by the host machine configuration), operator fusion actions (e.g., to limit the extent of operator failure), operator unfusion actions (e.g., to reduce operation of potentially malfunctioning operators) code exportation tools (e.g., to export the code to another format, IDE, or program that supports the referenced methods), a debugging tool (e.g., to correct code syntax) or the like. In embodiments, a user or developer may select one or more items from the set of candidate items. The selected items may be performed. Other methods of providing the set of candidate items are also possible.

Method 1400 concludes at block 1499. Aspects of method 1400 may provide performance or efficiency benefits for warning data management. For example, aspects of method 1400 may have positive impacts with respect to development of a streaming application. As described herein, the detecting, identifying, and providing described herein may each occur in an automated fashion without user invention. Altogether, determination and performance of an execution action based on detected warning data may be associated with performance or efficiency benefits (e.g., development speed, error elimination, computing resource efficiency).

Figure 15:
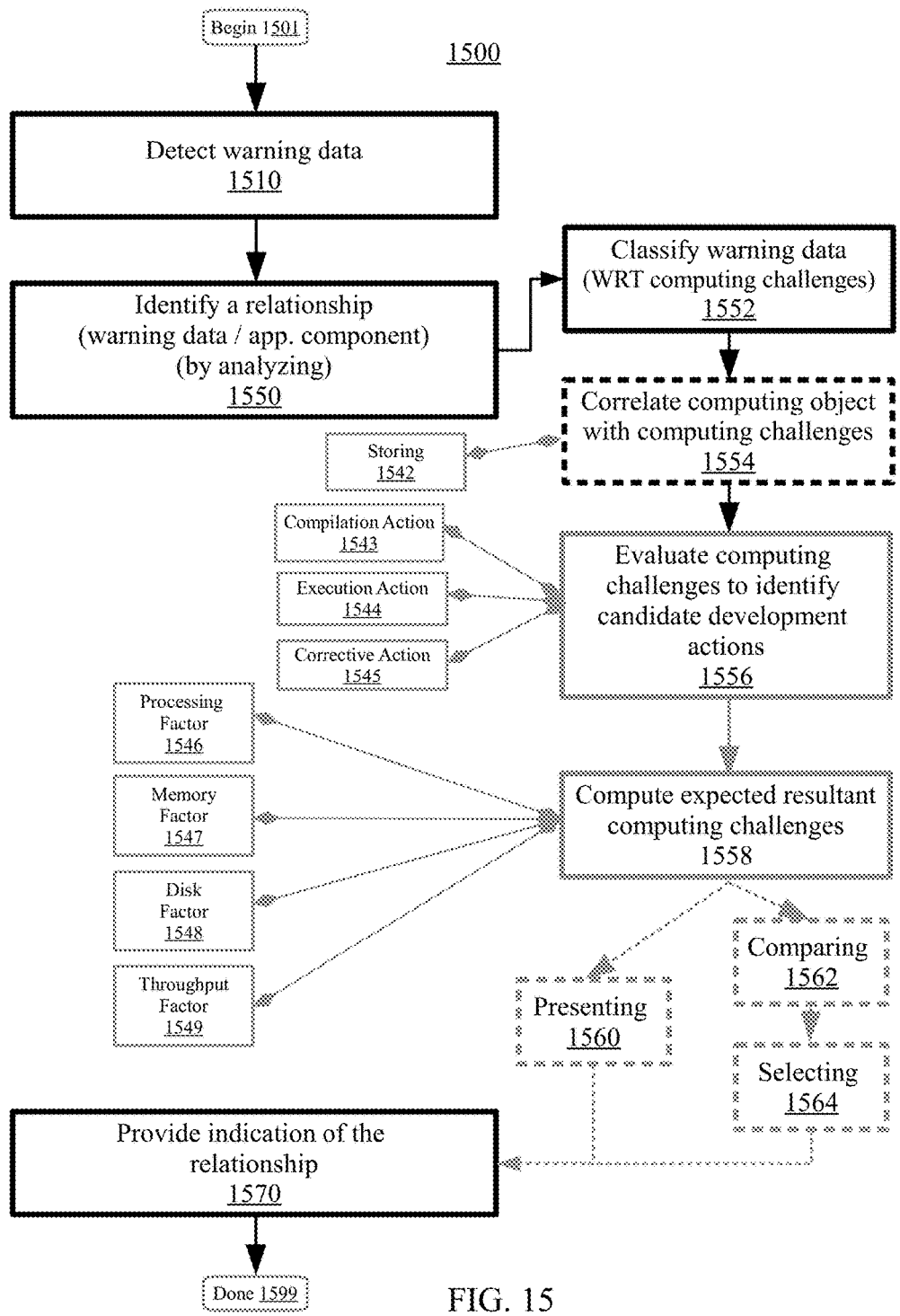
FIG. 15 is a flowchart illustrating a method for managing a set of warning data with respect to a development phase in a computing environment, according to embodiments.

FIG. 15 is a flowchart illustrating a method 1500 for managing a set of warning data with respect to a development phase in a computing environment, according to embodiments. Aspects of the method 1500 may relate to a set of computing challenges. The method 1500 may begin at block 1501. A set of warning data may be detected at block 1510. At block 1550, a relationship between the set of warning data and a component of an application may be identified. At block 1570, an indication of the relationship may be provided. Aspects of the method 1500 may substantially correspond to other embodiments described herein, including FIGS. 1-19.

In embodiments, the set of warning data may be classified with respect to a set of computing challenges at block 1552. Classifying can include categorizing, organizing, mapping, arranging, or grouping the set of warning data. In embodiments, the set of warning data may be classified with respect to a set of computing challenges. Generally, the computing challenges can include computing performance, virtual machine management, computing resource demands, software instability, software incompatibilities, power management and the like. In certain embodiments, the computing challenges may relate to stream operator performance in a streaming application. As examples, the computing challenges may include issues related to the management of throughput rate, processing resources, memory resources, and storage resources utilized by a set of streaming operators deployed in a streaming application. As described herein, the set of warning data may be classified with respect to the set of computing challenges. In embodiments, classifying the warning data may include sorting the warning data into groups of related computing challenges. For example, a first set of warning data that indicates possible impacts to the throughput rate may be sorted into a first group of computing challenges related to throughput rate issues, while a second set of warning data that indicates a potential influence to the processing resource utilization of one or more operators may be sorted into a second group of computing challenges related to processor resource utilization issues. Other methods of classifying the set of computing challenges are also possible.

In embodiments, the set of computing challenges may be correlated with the computing object at block 1554. Generally, correlating may include linking, relating, associating, or otherwise connecting the set of computing challenges with the computing object. In embodiments, correlating the computing challenges with the computing object may include linking one or more computing challenges with one or more portions of the programming code included in the computing object. For instance, correlating may include annotating a line of code or other code location of the computing object with a computing challenge tag that indicates a relation to a particular computing challenge. Consider the following example. A first code location of the computing object may include a function that defines the amount of processing resources allocated to a particular stream operator. In embodiments, the amount of processing resources defined by the function for allocation to a particular stream operator may limit the throughput rate achievable by the stream operator such that occurrence of a stream flow bottleneck is predicted. Accordingly, the first code location may be annotated with a computing challenge tag that indicates a relation to stream operator throughput issues. Other methods of correlating the set of computing challenges with the computing object are also possible.

In embodiments, an element of the correlation between the set of computing challenges and the computing object may be stored at block 1542. The element of the correlation may be stored in an integrated development environment (IDE). Generally, storing can include collecting, saving, capturing, gathering, aggregating, recording, or otherwise maintaining the element of the correlation. In embodiments, the element of the correlation may include a feature, characteristic, identifier, or other indication of the relationship between set of computing challenges and the computing object. For instance, storing the element of the correlation may include saving a message or notification within the IDE that describes the impact of a particular computing challenge on the application, and makes note of one or more aspects of the computing object that are related to the computing challenge (e.g., code location, function or operator that may not operate as desired due to the computing challenge). Other methods of storing the element of the correlation are also possible.

In embodiments, the set of computing challenges may be evaluated at block 1556. The set of computing challenges may be evaluated to identify a set of candidate development actions. The set of candidate development actions may include both a first candidate development action and a second candidate development action. Generally, evaluating the set of computing challenges may include analyzing, examining, or inspecting the computing challenges. In embodiments, evaluating the set of computing challenges may include examining the set of warning data and the computing object associated with a particular computing challenge to identify the first and second candidate development actions. In certain embodiments, evaluating the set of computing challenges to identify the set of candidate development actions may include analyzing aggregated historical information and archived data associated with the set of warning data (e.g., profile information, historical performance metrics). As described herein, the first and second candidate development actions may include tasks, jobs, operations, activities, or other processes performed during the compilation phase of the code development process. In embodiments, the first and second candidate development actions may include suggested solutions or other corrective measures recommended to positively impact the computing challenges (e.g., solutions or actions that were used in the past to reduce similar computing challenges, as indicated by historical utilization and performance data). As examples, the candidate development actions may include operator fusion actions, fusion action notifications, parameter adjustments, code debugging, operator replacement, or other processes. Other methods of evaluating the computing challenges to identify the candidate development actions are also possible.

In embodiments, the candidate development actions may include a compilation action at block 1543, an execution action at block 1544, or a corrective action at block 1545. As described herein, the compilation action, execution action, and corrective action may include one or more tasks, jobs, operations, or other processes performed during or in relation to the compilation phase, execution phase, or development phase respectively. For instance, the compilation action may include running a code diagnostic tool, debugging, collecting and storing a set of warning data or the like. The execution action may include running just-in-time compilation, executing the program, performing a fusion action, runtime check, or code deployment. The corrective action may include a solution, fix, technique, or other action to mitigate or resolve an error event (e.g., code revision, resource allocation). Other candidate development actions are also possible.

In embodiments, one or more expected resultant computing challenges may be computed at block 1558. The expected resultant computing challenges may include a first expected resultant computing challenge for the first candidate development action and a second expected resultant computing challenge for the second candidate development action. Generally, computing may include calculating, determining, appraising, evaluating, or otherwise ascertaining the expected resultant computing challenges. In embodiments, computing the expected resultant computing challenges may include analyzing archived utilization records and historical performance data to calculate a predicted or estimated outcome of a particular development action. In embodiments, the expected resultant computing challenges may include a set of values or other quantitative indications of the anticipated result of the development action. The set of values may correspond to one or more of a processing utilization factor (e.g., central processing unit resources usage) at block 1546, a memory utilization factor (e.g., random access memory resources usage) at block 1547, a disk utilization factor (e.g., persistent storage resources usage) at block 1548, or a throughput factor (e.g., network bandwidth resources) at block 1549. As an example, for a candidate development action that includes compiling a set of source code into a particular computing language, an expected resultant value that indicates a predicted disk utilization value may be calculated. For example, in a scenario in which the source code is set to be compiled into a first assembly language, a predicted disk utilization value of 5.6 gigabytes may be calculated. Other methods of computing the expected resultant computing challenge are also possible.

In embodiments, the expected resultant computing challenges may be presented for user-selection of one or more candidate development actions at block 1560. Aspects of the disclosure, in certain embodiments, relate to receiving a user's input to determine a desired candidate development action. Presenting the expected resultant computing challenges may include displaying a list, dialog box, or other interface configured to receive and process user input that indicates selection of one or more candidate development actions. For instance, presenting the expected resultant computing challenges may include displaying textual descriptions, still images, videos, or simulations that illustrate potential causes, impacts, solutions, and possible consequences of the computing challenges that may result from the selection of one or more development actions. As an example, referring to the example above in which the development action includes allocating additional processing resources to a streaming operator to achieve a desired throughput value, presenting the computing challenges may include showing simulations of the expected data flow through the operator graph, increased power consumption forecasts (e.g., based on the increased processing resource allocation), and other information that may influence a user's decision. In embodiments, aspects of the disclosure relate to receiving a user's input indicating selection of a particular development action. In response to receiving a user's selection, the development action may be performed. The method may proceed to block 1570.

In embodiments, a plurality of expected resultant computing challenges may be compared at block 1562. Aspects of the disclosure, in certain embodiments, relate to determining a particular candidate development action (e.g., for execution) without user intervention. Accordingly, aspects of the disclosure relate to comparing a first expected resultant computing challenge corresponding to a first candidate development action with a second expected resultant computing challenge corresponding to a second candidate development action. Generally, comparing can include contrasting, correlating, juxtaposing, matching, evaluating, or otherwise examining the expected resultant computing challenges with respect to each other. In embodiments, comparing the first and second expected resultant computing challenges may include separately modeling the predicted performance behavior that may result from executing the first candidate development action and the second development action. As an example, performance metrics including graphs and charts illustrating expected resource utilization and data flow (e.g., tuple throughput) may be generated for multiple scenarios (e.g., a first scenario based on the first expected resultant computing challenge and a second scenario based on the second expected resultant computing challenge.) Other methods of comparing the first and second expected resultant computing challenges are also possible.

In embodiments, a candidate development action may be selected at block 1564. Selecting a candidate development action may include selecting one of the candidate development actions corresponding to the expected resultant computing challenges compared at block 1562 (e.g., the first or second candidate development action). Generally, selecting can include choosing, electing, deciding, picking, ascertaining, or otherwise determining the candidate development action. The selected candidate development action may be performed, added to a command queue for scheduling, or provided to a user for authentication. Selecting can include, for example, storing a data value (e.g., entering a digit/character in a database), transmitting a data object (e.g., sending an object having metadata), routing a message (e.g., publishing a startup expectation), or providing/performing/processing an operation (e.g., a notification). In embodiments, selecting the candidate development action may be based on determining that one of the expected resultant computing challenges (e.g., the first expected resultant computing challenge) exceeds one or more other expected resultant computing challenges (e.g., the second expected resultant computing challenge). For instance, referring to the example described above, the performance behavior models and other performance metrics for each of the expected resultant computing challenges may be analyzed, and an expected resultant computing challenge that leads to a desirable performance outcome (e.g., resource usage efficiency, faster data processing speed) may be determined. Accordingly, the candidate development action corresponding to the determined expected resultant computing challenge may be selected. In embodiments, aspects of the disclosure relate to performing the selected candidate development action. Other methods of selecting the candidate development action are also possible.

Method 1500 concludes at block 1599. Aspects of method 1500 may provide performance or efficiency benefits for warning data management. For example, aspects of method 1500 may have positive impacts with respect to management of a set of computing challenges and candidate development actions associated with a set of warning data. As described herein, the detecting, identifying, and providing described herein may each occur in an automated fashion without user invention. Altogether, leveraging the information provided by compilation phase warning messages may be associated with performance or efficiency benefits (e.g., development speed, error elimination, computing resource efficiency).

Figure 16:
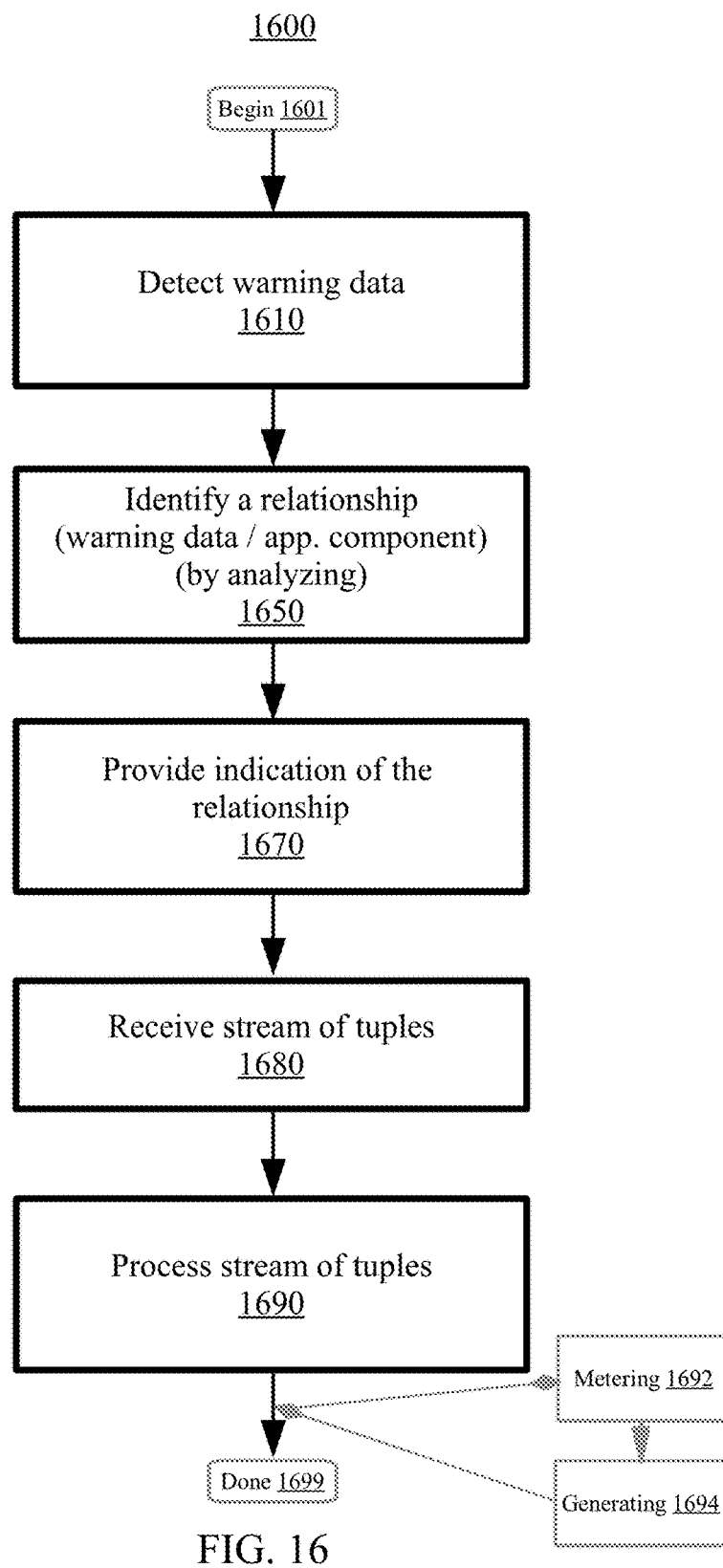
FIG. 16 is a flowchart illustrating a method for managing a data flow in a computing environment, according to embodiments.

FIG. 16 is a flowchart illustrating a method 1600 for managing a data flow in a computing environment, according to embodiments. Aspects of the method 1600 may relate to receiving and processing a stream of tuples. The method 1600 may begin at block 1601. A set of warning data may be detected at block 1610. At block 1650, a relationship between the set of warning data and a component of the application may be identified. At block 1670, an indication of the relationship may be provided. Aspects of the method 1600 may substantially correspond to other embodiments described herein, including FIGS. 1-19.

At block 1680, a stream of tuples is received. The stream of tuples may be processed by a plurality of processing elements (e.g., stream operators) operating on a set of compute nodes (e.g., in a stream application environment). The stream of tuples may be received consistent with the description herein including FIGS. 1-19. Current/future processing by the plurality of processing elements may be performed consistent with the description herein including FIGS. 1-19. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In embodiments, the stream of tuples is processed at block 1690. The stream of tuples may be processed by the plurality of processing elements operating on the set of compute nodes. The stream of tuples may be processed consistent with the description herein including FIGS. 1-19. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

In embodiments, use of the warning data may be metered at block 1692. Metering can include measuring, tracking, documenting, recording, or calculating the degree or extent of the utilization of the warning data. The degree of utilization may be calculated based on the number of times the warning data was accessed (e.g., 10 times, 100 times), the number of times the warning data was compiled (e.g., in association with the computing object), resource usage (e.g., data processed by streaming applications that include the warning data) or other means. Based on the metered use, an invoice may be generated at block 1694. The invoice may include a bill, fee, service charge, or other itemized breakdown specifying compensation for the usage of the set of warning data. Subscription based models are also possible. Method 1600 may conclude at block 1699.

Figure 17:
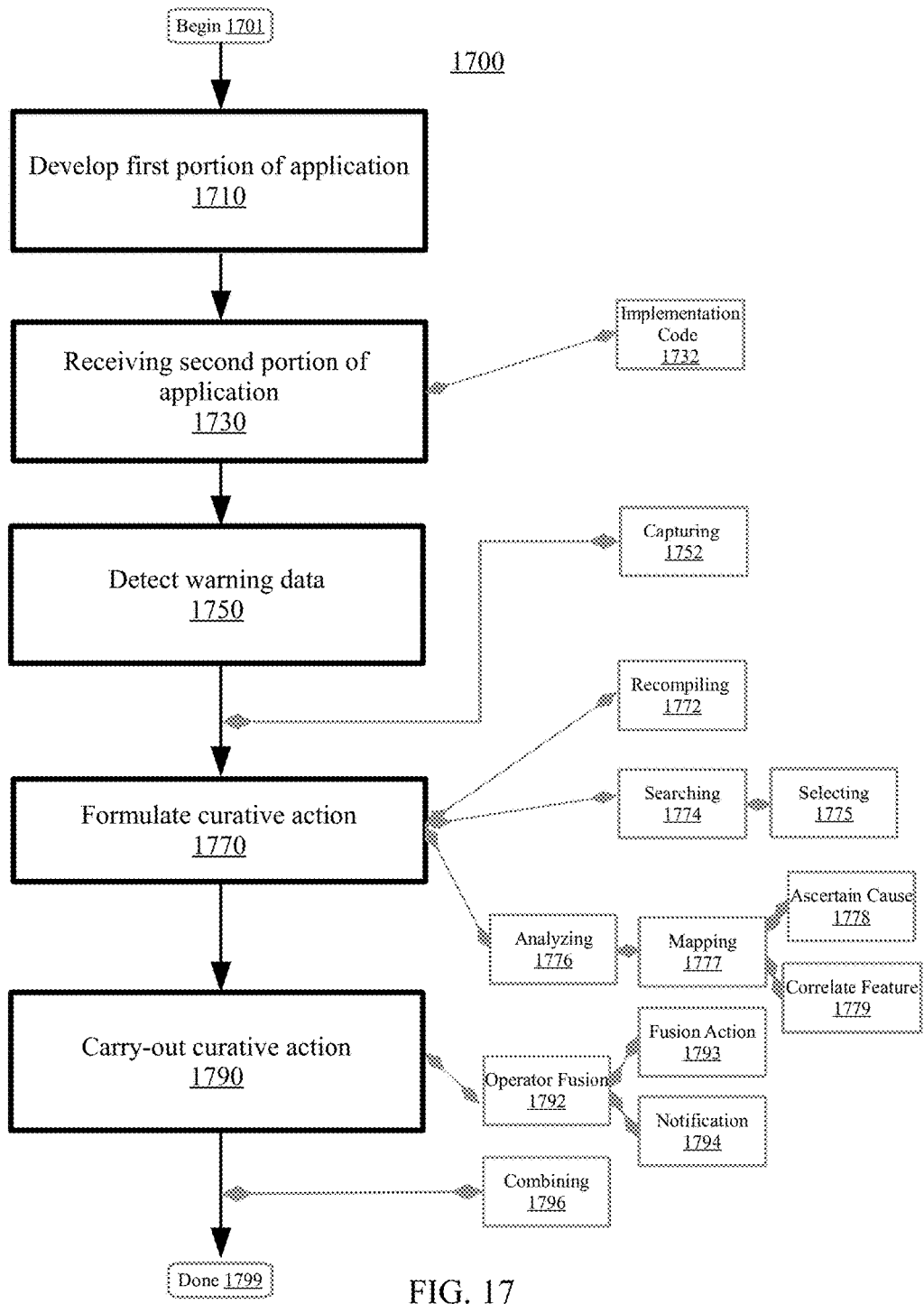
FIG. 17 is a flowchart illustrating a method for using a set of warning data to manage distributed development of an application in a computing environment, according to embodiments.

FIG. 17 is a flowchart illustrating a method 1700 for using a set of warning data to manage distributed development of an application in a computing environment, according to embodiments. As described herein, the application may include a software program, package, executable file, or other set of digital computer instructions. In embodiments, the computing environment may include a distributed computing environment or a stream computing environment. Aspects of the disclosure relate to the recognition that, in embodiments, application development tasks may be shared or delegated, such that various portions of phases of application development (e.g., compilation, execution, development) may be performed by different parties (e.g., different users, companies, organizations) and in distinct computing environments. Accordingly, aspects of the disclosure relate to using the set of warning data to facilitate distributed application development. Method 1700 may begin at block 1701.

At block 1710, a first portion of an application may be developed. The first portion of the application may be developed by a first user. Generally, developing can include designing a program, generating program code (e.g., computing object), debugging the code, testing the program, configuring features and parameters (e.g., in an integrated user development environment), compiling the code (e.g., just-in-time compilation), executing the program, or performing other processes. The first portion of the application may include a piece, segment, section, chunk, block, or other in-development part or aspect of a software program. For example, the first portion of the application may be developed for inclusion in a larger application undergoing distributed development. As described herein, in certain embodiments the first portion of the application may be developed by a first user. The first user may include an individual, company, institution, or other organization. In certain embodiments, the first portion may include a form of middleware configured to provide software tools and services (e.g., input/output tasks, communication) to facilitate the interface between a system's operating system and other specialized applications.

In embodiments, the first portion of the application may include a segment of a software program delegated to the first user for development. Consider the following example. In embodiments, a first organization may receive an order from a client for the development of the first portion of the application. The order may specify developmental tasks (e.g., program code writing, debugging) as well as a completion point (e.g., the point at which development of the first portion may be ceased) for the first portion of the application. Accordingly, the first user may develop the first portion of the application in accordance with the order received from the client. In embodiments, the first user may develop the first portion of the application to facilitate combination with other applications, software, or computing objects (e.g., a second portion of the application). Other methods of developing the first portion of the application are also possible.

At block 1730, a second portion of the application may be received. The second portion may be received by the first user. In embodiments, the second portion of the application may have been compiled and developed by a second user. Generally, receiving can include collecting, requesting, gathering, obtaining, or accepting delivery of the second portion of the application (e.g., from the second user). In embodiments, the second user may send the second portion of the application to the first user to receive. In certain embodiments, the first user may request the second portion of the application from the second user. For instance, in response to reaching completion on development of the first portion of the application, the first user may notify the second user, and request transmission of the second portion of the application. Other methods of receiving the second portion of the application are also possible.

In embodiments, the second portion of the application may include a piece, segment, section, or other in-development part or aspect of a software program. As shown in FIG. 17, the second portion of the application may include a set of implementation code at block 1732. The implementation code may include lines or blocks of programming code. In certain embodiments, the content of the second portion of the application may differ from the first portion of the application. Similarly to the first user, the second user may include an individual, company, institution, or other organization. The second user may be different from the first user. In embodiments, the second portion of the application may be compiled and developed by the second user. As described herein, compiling may include the translation, conversion, or transformation of a set of programming code (e.g., of the second portion of the application) into a second programming language (e.g., a lower-level programming language such as assembly language or machine code) using a compiler. In embodiments, the second portion of the application may be designed to correspond to the first portion of the application (e.g., to combine with at least the first portion of the application and form a complete software program). For example, the first portion and second portion may each represent a part of a software application being developed in a distributed environment.

At block 1750, a set of warning data may be detected. The set of warning data may be included in the second portion of the application. In embodiments, the set of warning data may be coupled with a computing artifact included in the second portion of the application. Generally, detecting can include ascertaining, recognizing, discovering, discerning, or otherwise identifying the set of warning data. Detecting can include identifying that the second portion of the application includes a computing artifact (e.g., executable package of compiled programming code) in which the set of warning data is associated with a computing object (e.g., set of programming code). In embodiments, the computing artifact may include a batch of source code compiled into an executable program by the second user. In embodiments, detecting the set of warning data can include analyzing the computing artifact and identifying a set of warning data that is linked to one or more portions of the computing object. As an example, in certain embodiments, detecting the set of warning data may include parsing the implementation code of the second portion of the application (e.g., using a code analysis tool) and determining that one or more locations of the implementation code are annotated with tags that indicate associated warning data. Other methods of detecting the set of warning data are also possible.

The set of warning data may include information, notifications, alerts, recommendations, and other forms of data that indicate the presence of a potential error, mistake, irregularity, problem or other issue with respect to the computing environment. The set of warning data may include information regarding suggested or recommended actions, discouraged actions, potential incompatibilities, or other information relevant to the code development process or the computing environment. In embodiments, the set of warning data may be detected in the second portion of an in-development software application. In certain embodiments, the warning data may be detected in an integrated development environment (IDE). Other methods of detecting the set of warning data are also possible.

Consider the following example. In certain embodiments, the second portion of the application may be received by the first user from the second user. In response to receiving the second portion of the application, the first user may utilize a code diagnostic tool to analyze the programming code of the second portion of the application. The code diagnostic tool may parse the second portion of the application and identify one or more locations annotated with a tag, marker, or other identifier. In embodiments, the annotated locations may indicate an association, correlation, or link between the second portion of the application and a set of warning data. Accordingly, as described herein, the code diagnostic tool may identify the annotated locations to detect the set of warning data. As another example, in certain situations, the first user may display a visual representation of the second portion of the application in an integrated development environment. For instance, one or more operator graphs corresponding to aspects of the second application may be displayed in an IDE. In certain embodiments, particular operators of the operator graph may be flagged, tagged, or highlighted to indicate an association between the operator and the set of warning data. Accordingly, the IDE may be configured to detect those operators associated with the set of warning data. Other methods of detecting the set of warning data are also possible.

In embodiments, the set of warning data may be captured at block 1752. The set of warning data may be captured in response to detecting the set of warning data for inclusion in an archive when carrying-out a curative action. Generally, capturing can include saving, collecting, gathering, aggregating, maintaining, or otherwise storing the set of warning data. In embodiments, capturing the set of warning data may include recording the data in an archive (e.g., for use when carrying-out a curative action). The archive may include a data log, database, computer file, storage device or directly, or other digital collection of data. As an example, capturing the set of warning data may include documenting the time and date the warning was detected, content of the warning, warning severity, affected code portions, potential consequences, candidate solutions, related warning data, archived data pertaining to the warning, and other relevant information in the archive. In embodiments, capturing the set of warning data may include acquiring image or video data (e.g., pictures of the warning message, video footage illustrating candidate solutions) and storing it in the data log. Other methods of capturing the set of warning data area also possible.

At block 1770, a curative action may be formulated for utilization to develop the application. The curative action may be formulated based on the set of warning data. Formulating can include computing, identifying, ascertaining, or otherwise determining the curative action. In embodiments, formulating the curative action may include identifying one or more operations based on the set of warning data. For example, formulating the curative action may include examining the first portion of the application, the second portion of the application, and the associated set of warning data in order to determine an operation or series of operations associated with positive impacts with respect to the first portion of the application, the second portion of the application, or the set of warning data. Generally, the curative action can include a solution, fix, technique, or other operation configured to facilitate development of the application. In embodiments, the curative action may include an operation configured to connect, integrate, merge, or link the first portion of the application and the second portion of the application to create a complete application. In embodiments, the curative action may include a solution to an error event detected with respect to the first portion of the application or the second portion of the application (e.g., in an execution phase). In certain embodiments, the curative action may include a revision or correction to the set of implementation code configured to reduce the set of warning data. Other methods of formulating the curative action are also possible.

In embodiments, the curative action may include an operation configured to connect, integrate, merge, or link the first portion of the application and the second portion of the application together. In embodiments, aspects of the curative action may relate to preparing the portions of the application for combination into a complete application. For instance, the curative action may include normalizing aspects of the first portion of the application and the second portion of the application to comply with a particular standard or criterion. As an example, the curative action may include modifying the implementation code of the first portion of the application and the second portion of the application to transform or convert the programming code to the same language, style, or format. As another example, the curative action may include editing the implementation code to reduce variable redundancy or other conflicts between the first portion and the second portion (e.g., shared variables or addresses used in both portions). Other types of curative action are also possible.

In embodiments, the curative action may include a response to an error event detected with respect to the first portion of the application or the second portion of the application (e.g., in an execution phase). For instance, the corrective action may include a solution, fix, technique, or other action to mitigate or resolve the error event. In embodiments, the corrective action may include a technique or operation performed based on the set of warning data or log files for the error event. As an example, in response to running the application (e.g., in an execution phase), a runtime error event may occur. The runtime error event may be the result of insufficient computing resources (e.g., memory, processing resources) allocated to the application. Accordingly, the corrective action may include using a system resource diagnostic tool to examine the resource allocations of the computing environment, and reassigning sufficient resources to the application to facilitate successful execution. Other types of curative action are also possible.

In embodiments, the curative action may include a revision, update, or correction to the set of implementation code configured to positively impact the set of warning data. For instance, the corrective action may include parsing, scanning, analyzing, or examining the set of warning data in association with the set of implementation code to identify one or more code locations that correspond to a cause of the warning data, and revising the code location to address/reduce (e.g., alleviate) the set of warning data (e.g., qualitatively or quantitatively). In embodiments, the corrective action may be performed prior to compiling the set of implementation code. Consider the following example. A set of implementation code associated with the first portion of the application or the second portion of the application may be analyzed, and a set of warning data that indicates the presence of a division by zero error may be identified. Accordingly, the corrective action may include scanning the implementation code to identify the location of the division by zero error (e.g., function or other arithmetic expression) and modifying the code to revise the error. Other types of curative action are also possible.

In embodiments, the curative action may include recompiling the second portion of the application at block 1772. Generally, recompiling can include using a compiler to translate, convert, or transform the programming code of the second portion of the application to a machine-readable format for execution (e.g., assembly language, machine code). Aspects of the disclosure relate to the recognition that, in certain situations, portions of applications developed in separate computer environments may reference particular database or index locations, or be configured for execution within particular system configurations that may be different from the configuration in which they will be utilized. For instance, in embodiments, the second portion of the application may be compiled into a computer language that is executable by the computing machine on which it was developed, but may not be executable on another computing machine (e.g., client computing device). Accordingly, aspects of the disclosure relate to recompiling the second portion of the application to correspond to the language and format of the first portion of the application. As an example, in embodiments, the second portion of the application may be recompiled to update query plans, data index addresses, and other operations based on the first portion of the application and the configuration of the host computing device. Other methods of recompiling the second portion of the application are also possible.

In embodiments, a set of profile information may be searched for a nature of a particular warning at block 1774. Searching the set of profile information for the nature of the particular warning may include using the set of warning data. Generally, searching can include inspecting, investigating, seeking, or otherwise examining the set of profile information. In various embodiments, the set of profile information may correspond to a particular operator (e.g., streaming operator), software application, computer task, operating system, hardware device, or other physical or virtual resource. In embodiments, searching the set of profile information may include using one or more of a warning identification code, key terms of the warning message, or metadata associated with the warning message to ascertain a portion of the set of profile information that is related to the warning message. The set of profile information may include a characterization or description of a particular warning message that provides information regarding the type, triggering thresholds (e.g., particular configuration in which a warning message occurs), candidate solutions, historical data and other data pertaining to the warning message. By searching the set of profile information, a nature of the warning message may be identified. The nature of the warning message may include information such as potential causes of the warning, candidate solutions, detailed warning explanations and the like. In embodiments, the nature of the warning message may be correlated with the set of warning data. Other methods of searching the set of profile information are also possible.

In embodiments, the curative action may be selected at block 1775. The curative action may be selected based on the nature of the particular warning message. Generally, selecting can include choosing, electing, deciding, picking, concluding, ascertaining, or otherwise determining the curative action. In embodiments, selecting the curative action may include checking log files, databases, or archives associated with one or more code commands or operators for solutions or actions that were used in the past to positively impact similar warning messages. As examples, for a particular warning message that relates to a syntax error, a curative action may be selected that includes a code debugging tool. For a particular warning message that relates to resource inefficiencies, a curative action may be selected that includes running performance metric and resource utilization diagnostics to balance resource usage. Other methods of selecting the curative action are also possible.

In embodiments, an error event which pertains to the second portion of the application may be analyzed at block 1776. Analyzing the error event can include scanning, parsing, inspecting, or otherwise examining the error event to identify information regarding the error (e.g., consequences, triggering conditions, causes, fixes, improvements, solutions). In embodiments, analyzing the error event may include checking log files associated with the error event or an element of the computing artifact (e.g., processing element, operator). Generally, the error event may include an issue, defect, failure, deficiency, or other unexpected result that occurs in relation to the hardware or software of the computing environment. In embodiments, the error event may occur in relation to the second portion of the application. For example, the error event may include a runtime error that indicates that the location of a certain component (e.g., dynamically linked library) necessary for execution of a particular feature of the second portion of the application was not specified within the programming code. Accordingly, analyzing the runtime error may include parsing the error event to ascertain the missing component, the location in the programming code where the component should be specified, and other such information. Other methods of analyzing the error event are also possible.

In embodiments, the analysis of the error event may be mapped to the set of warning data at block 1777. Generally, mapping can include linking, associating, relating, or otherwise correlating the analysis of the error event to the set of warning data. In embodiments, mapping the analysis of the error event may include saving data regarding the consequences, triggering conditions, causes, fixes, updates, solutions, and other information (e.g., the results of analyzing the error event) along with the set of warning data that corresponds to the error event. As an example, in the case that the error event includes the failure of a particular stream operator, information regarding the cause and reason of the failure (e.g., acquired by analyzing the error event) may be stored along with the set of warning data associated with the error event. In embodiments, one or more code locations related to the operator failure may be correlated to the warning data. Other methods of mapping the analysis of the error event to the set of warning data are also possible.

In embodiments, mapping the analysis of the error event to the set of warning data may include mapping to ascertain a cause of the error event at block 1778. In embodiments, the analysis information mapped to the set of warning data may provide information as to the origin, nature, or cause of the error event. Consider the following example. In embodiments, the second portion of the application may include a set of warning data that indicates that the programming code includes a logic statement that will never be true (e.g., dim x as integer; do while x<5; x=1; x=x+1; loop). In embodiments, during runtime, an error event regarding a stack overflow exception may be detected. In response to analyzing the error event, it may be determined that more methods were called than the memory allocated for executing the second portion of the application could process. Information regarding the results of the analysis of the error event may be mapped to the set of warning data. In embodiments, the analysis of the error event may be used in conjunction with the warning data to ascertain the cause of the error event. For instance, in embodiments it may be determined that the presence of the never-true statement in the programming code (e.g., as indicated by the set of warning data) led to an infinite loop that expended the memory resources allocated for the second portion of the application (e.g., the loop will always end in 2 and the loop will never break). Accordingly, the never-true statement in the programming code may be identified as the cause of the error event. In embodiments, a corrective action may be taken to resolve the cause of the error event. Other methods of ascertaining the cause of the error event are also possible.

In embodiments, mapping the analysis of the error event to the set of warning data may include mapping to correlate a feature with one or more of a computing object or a code location at block 1779. The feature can include an aspect, component, characteristic, or element of the error event. In embodiments, correlating the feature may include extracting a particular aspect of the error event and linking it to a portion of a computing object or a line of programming code. The linked code location or computing object may be specifically referenced by the error event or determined to be related to the error event in response to the error event analysis. In certain embodiments, correlating the feature of the error event with the code object may be configured to emphasize or call attention to one or more code locations that are potentially associated with the error event. As an example, in response to detecting an error event related to an arithmetic expression exception (e.g., an error that may be caused by an illegal arithmetic operation), a feature of "arithmetic expression" may be identified, and one or more code locations that include arithmetic expressions or other mathematical functions may be marked, flagged, or highlighted (e.g., for revision or correction by a user or developer). Other methods of mapping to correlate a feature are also possible.

At block 1790, the curative action may be carried out. In embodiments, the curative action may be carried out to develop the application. Generally, carrying-out can include running, performing, executing, initiating, instantiating, implementing, enacting, or otherwise putting the curative action into operation. As described herein, carrying-out the curative action may facilitate the development of an application including both the first portion of the application and the second portion of the application. In embodiments, carrying out the curative action may include selecting a performance configuration for the curative action. The performance configuration may include an arrangement of software and hardware resources to facilitate implementation of the curative action. In embodiments, the performance configuration may include deploying the first or second portion of the application to a particular computing environment (e.g., virtual machine, physical compute node), allocating resources for performance of the curative action, scheduling the curative action in a job scheduler (e.g., choosing an execution time, frequency), or configuring other aspects of the computing environment for performance of the curative action based on the nature of the curative action and the set of warning data. Other methods of performing the curative action are also possible.

In embodiments, carrying out the curative action may include an operator fusion action at block 1792. Generally, operator fusion can include the process of joining or combining a plurality of operators (e.g., streaming operators) together to form a single processing element. Operator fusion may be associated with benefits such as code simplification, processing efficiency, and resource management. In embodiments, a fusion operation corresponding to a plurality of operators may be performed at block 1793. The fusion operation may include fusing one or more operators into a single processing element. As described herein, the fusion action may be based on the set of warning data. For instance, in various embodiments, operators that are associated with the set of warning data may be prevented from fusing with other operators. In embodiments, the nature of the warning data may be analyzed to determine whether fusion between particular operators may be safely and reliably performed. In embodiments, a fusion action notification may be provided at block 1794. The fusion action notification may include an alert, request for verification, or other statement related to the fusion action. In certain embodiments, the fusion action notification may be provided to a user or developer prior to performance of the fusion action in order to inform the user of the pending operator fusion. For instance, the fusion action notification may request the user's authorization to fuse one or more operators associated with warning data. Other types of operator fusion actions and curative actions beyond those described explicitly herein are also possible.

In embodiments, the first and second portions may be combined at block 1796. The first and second portions may be combined to form a single completed application. Generally, combining can include connecting, integrating, linking, coupling, or otherwise joining the first portion of the application and the second portion of the application. In embodiments, combining the first and second portions may include merging a set of implementation code from each portion of the application together to form a single computing object. As described herein, combining the first and second portions of the application may include formatting or normalizing the implementation code to a unified standard, style, or criterion, and compiling the first and second portions of the application into a single computing artifact. In embodiments, combining the first and second portions of the application may be based on the set of warning data. As an example, in certain embodiments the first and second portions of the application may not be combined until a particular warning message of the set of warning data (e.g., a warning with a severity level about a threshold) is resolved (e.g., by a curative action). Other methods of combining the first and second portions are also possible.

Consider the following example. As described herein, the first portion of the application may be developed by a first user, and the second portion of the application may be received from a second user. In embodiments, the first portion of the application may include a middleware application configured to facilitate interfacing between a system operating system and the second portion of the application. The second portion of the application may be a streaming program. In embodiments, a set of warning data may be detected in association with the second portion of the application. For instance, the set of warning data may indicate an unchecked type casting as in the following code segment:
private Map<String, String>someMap=new HashMap<String, String>( );
someMap=(
someMap=(HashMap<String, String>)getApplicationContext( ).getBean("someMap");

In response to detecting the set of warning data, a curative action may be formulated to facilitate combination of the first and second portions of the application. For example, the curative action may include using a debugging tool to resolve the unchecked type casting warning. The curative action may also include standardizing the first and second application to a unified format, and reducing redundant code. In embodiments, in response to performing the curative action, the first and second portions of the application may be compiled together to combine them into a single cohesive application. Other methods of combining the first and second portions of the application are also possible.

Method 1700 concludes at block 1799. Aspects of method 1700 may provide performance or efficiency benefits for warning data management. For example, aspects of method 1700 may have positive impacts with respect to development of a streaming application. As described herein, the developing, receiving, detecting, formulating, and carrying-out described herein may each occur in an automated fashion without user invention. Altogether, determination and performance of an execution action based on detected warning data may be associated with performance or efficiency benefits (e.g., development speed, error elimination, computing resource efficiency).

Figure 18:
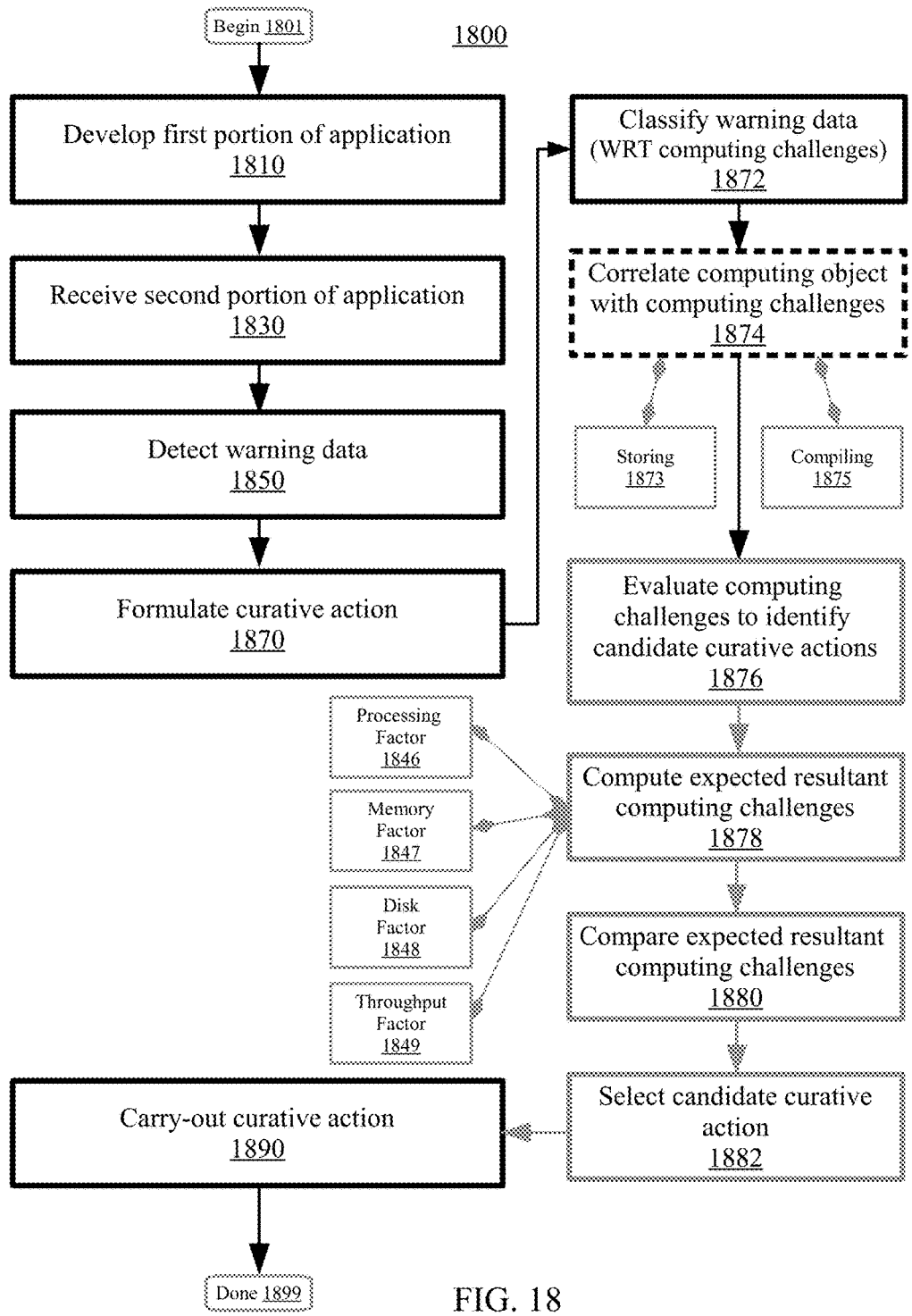
FIG. 18 is a flowchart illustrating a method for using a set of warning data to manage distributed development of an application in a computing environment, according to embodiments.

FIG. 18 is a flowchart illustrating a method 1800 for using a set of warning data to manage distributed development of an application in a computing environment, according to embodiments. Aspects of the method 1800 may relate to a set of computing challenges. The method 1800 may begin at block 1801. At block 1810, a first portion of an application may be developed. At block 1830, a second portion of the application may be received. At block 1830, a set of warning data may be detected. At block 1870, a curative action may be formulated. At block 1890, the curative action may be carried out. Aspects of the method 1800 may substantially correspond to other embodiments described herein, including FIGS. 1-19.

In embodiments, the set of warning data may be classified with respect to a set of computing challenges at block 1872. Classifying can include categorizing, organizing, mapping, arranging, or grouping the set of warning data. In embodiments, the set of warning data may be classified with respect to a set of computing challenges. Generally, the computing challenges can include computing performance, virtual machine management, computing resource demands, software instability, software incompatibilities, power management and the like. In certain embodiments, the computing challenges may relate to stream operator performance in a streaming application. As examples, the computing challenges may include issues related to the management of throughput rate, processing resources, memory resources, and storage resources utilized by a set of streaming operators deployed in a streaming application. As described herein, the set of warning data may be classified with respect to the set of computing challenges. In embodiments, classifying the warning data may include sorting the warning data into groups of related computing challenges. For example, a first set of warning data that indicates possible impacts to the throughput rate may be sorted into a first group of computing challenges related to throughput rate issues, while a second set of warning data that indicates a potential influence to the processing resource utilization of one or more operators may be sorted into a second group of computing challenges related to processor resource utilization issues. Other methods of classifying the set of computing challenges are also possible.

In embodiments, the set of computing challenges may be correlated with the computing object at block 1874. Generally, correlating may include linking, relating, associating, or otherwise connecting the set of computing challenges with the computing object. In embodiments, correlating the computing challenges with the computing object may include linking one or more computing challenges with one or more portions of the programming code included in the computing object. For instance, correlating may include annotating a line of code or other code location of the computing object with a computing challenge tag that indicates a relation to a particular computing challenge. Consider the following example. A first code location of the computing object may include a function that defines the amount of processing resources allocated to a particular stream operator. In embodiments, the amount of processing resources defined by the function for allocation to a particular stream operator may limit the throughput rate achievable by the stream operator such that occurrence of a stream flow bottleneck is predicted. Accordingly, the first code location may be annotated with a computing challenge tag that indicates a relation to stream operator throughput issues. Other methods of correlating the set of computing challenges with the computing object are also possible.

In embodiments, an element of the correlation between the set of computing challenges and the computing object may be stored at block 1873. The element of the correlation may be stored in an integrated development environment (IDE). Generally, storing can include collecting, saving, capturing, gathering, aggregating, recording, or otherwise maintaining the element of the correlation. In embodiments, the element of the correlation may include a feature, characteristic, identifier, or other indication of the relationship between set of computing challenges and the computing object. For instance, storing the element of the correlation may include saving a message or notification within the IDE that describes the impact of a particular computing challenge on the application, and makes note of one or more aspects of the computing object that are related to the computing challenge (e.g., code location, function or operator that may not operate as desired due to the computing challenge). Other methods of storing the element of the correlation are also possible.

In embodiments, a computing artifact may be compiled at block 1875. The computing artifact may include an element of the correlation. The computing artifact may include a digital package, bundle, or container including the computing object in association with the set of warning data. Compiling may include the translation, conversion, or transformation of the programming code into a target programming language (e.g., from a high-level programming language to a lower-level programming language such as assembly language or machine code) using a compiler. In embodiments, compiling may include converting the computing object into an executable program file that includes an element of the correlation. As an example, a message that describes potential effects and solutions of the computing challenges may be compiled and stored within the compiled artifact. Other methods of compiling the computing object are also possible.

In embodiments, the set of computing challenges may be evaluated at block 1876. The set of computing challenges may be evaluated to identify a set of candidate curative actions. The set of candidate curative actions may include both a first candidate curative action and a second candidate curative action. Generally, evaluating can include analyzing, examining, or inspecting the computing challenges. In embodiments, evaluating the set of computing challenges may include examining the set of warning data and the computing object associated with a particular computing challenge to identify the first and second candidate curative actions. In certain embodiments, evaluating the set of computing challenges to identify the set of candidate curative actions may include analyzing aggregated historical information and archived data associated with the set of warning data (e.g., profile information, historical performance metrics). As described herein, the first and second candidate curative actions may include tasks, jobs, operations, activities, or other processes. In embodiments, the first and second candidate curative actions may include suggested solutions or other corrective measures recommended to positively impact the computing challenges (e.g., solutions or actions that were used in the past to reduce similar computing challenges, as indicated by historical utilization and performance data). As examples, the candidate curative actions may include operator fusion actions, fusion action notifications, parameter adjustments, code debugging, operator replacement, or other processes. Other methods of evaluating the computing challenges to identify the candidate curative actions are also possible.

In embodiments, one or more expected resultant computing challenges may be computed at block 1878. The expected resultant computing challenges may include a first expected resultant computing challenge for the first candidate curative action and a second expected resultant computing challenge for the second candidate curative action. Generally, computing can include calculating, determining, appraising, evaluating, or otherwise ascertaining the expected resultant computing challenges. In embodiments, computing the expected resultant computing challenges may include analyzing archived utilization records and historical performance data to calculate a predicted or estimated outcome of a particular curative action. In embodiments, the expected resultant computing challenges may include a set of values or other quantitative indications of the anticipated result of the curative action. The set of values may correspond to one or more of a processing utilization factor (e.g., central processing unit resources usage) at block 1846, a memory utilization factor (e.g., random access memory resources usage) at block 1847, a disk utilization factor (e.g., persistent storage resources usage) at block 1848, or a throughput factor (e.g., network bandwidth resources) at block 1849. As an example, for a candidate curative action that includes placement of a particular operator into an operator graph, an expected resultant value of a bottleneck likelihood (e.g., probability that placement of the operator graph will lead to a network traffic bottleneck) may be calculated. For example, in response to placement of a custom operator with a maximum throughput rate of 900 tuples per second, the configuration of the operator graph may be analyzed and a bottleneck likelihood of 54% may be computed (e.g., using various techniques described herein). Other methods of computing the expected resultant computing challenge are also possible.

In embodiments, a plurality of expected resultant computing challenges may be compared at block 1880. As described herein, aspects of the disclosure relate to comparing a first expected resultant computing challenge corresponding to a first candidate curative action with a second expected resultant computing challenge corresponding to a second candidate curative action. Generally, comparing the expected resultant computing challenges can include contrasting, correlating, juxtaposing, matching, evaluating, or otherwise examining the expected resultant computing challenges with respect to each other. In embodiments, comparing the first and second expected resultant computing challenges may include separately modeling the predicted performance behavior that may result from executing the first candidate curative action and the second curative action. As an example, performance metrics including graphs and charts illustrating expected resource utilization and data flow (e.g., tuple throughput) may be generated for multiple scenarios (e.g., a first scenario based on the first expected resultant computing challenge and a second scenario based on the second expected resultant computing challenge.) Other methods of comparing the first and second expected resultant computing challenges are also possible.

In embodiments, a candidate curative action may be selected at block 1882. Selecting a candidate curative action may include selecting one of the candidate curative actions corresponding to the expected resultant computing challenges compared at block 1880 (e.g., the first or second candidate curative action). Generally, selecting can include choosing, electing, deciding, picking, ascertaining, or otherwise determining the candidate curative action. The selected candidate curative action may be performed, added to a command queue for scheduling, or provided to a user for authentication. Selecting can include, for example, storing a data value (e.g., entering a digit/character in a database), transmitting a data object (e.g., sending an object having metadata), routing a message (e.g., publishing a startup expectation), or providing/performing/processing an operation (e.g., a notification). In embodiments, selecting the candidate curative action may be based on determining that one of the expected resultant computing challenges (e.g., the first expected resultant computing challenge) exceeds one or more other expected resultant computing challenges (e.g., the second expected resultant computing challenge). For instance, referring to the example described above, the performance behavior models and other performance metrics for each of the expected resultant computing challenges may be analyzed, and an expected resultant computing challenge that leads to a desirable performance outcome (e.g., resource usage efficiency, faster data processing speed) may be determined. Accordingly, the candidate curative action corresponding to the determined expected resultant computing challenge may be selected. Other methods of selecting the candidate curative action are also possible.

Method 1800 concludes at block 1899. Aspects of method 1800 may provide performance or efficiency benefits for warning data management. For example, aspects of method 1800 may have positive impacts with respect to management of a set of computing challenges and candidate curative actions associated with a set of warning data. As described herein, the developing, receiving, detecting, formulating, and carrying-out described herein may each occur in an automated fashion without user invention. Altogether, leveraging the information provided by compilation phase warning messages may be associated with performance or efficiency benefits (e.g., development speed, error elimination, computing resource efficiency).

Figure 19:
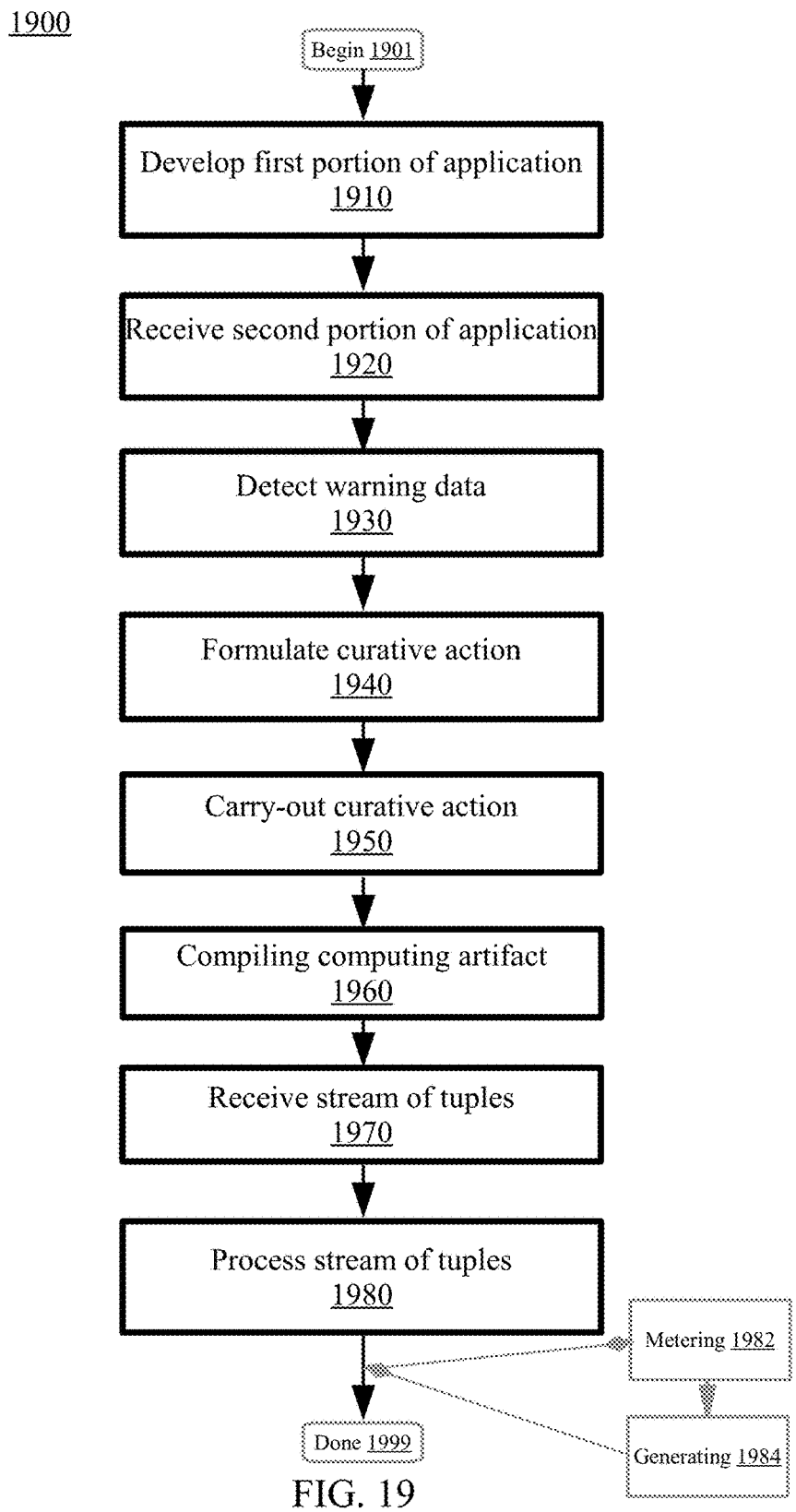
FIG. 19 is a flowchart illustrating a method for managing a data flow in a computing environment, according to embodiments.

FIG. 19 is a flowchart illustrating a method 1900 for managing a data flow in a computing environment, according to embodiments. Aspects of the method 1900 may relate to compiling a computing artifact and receiving and processing a stream of tuples. The method 1900 may begin at block 1901. At block 1910, a first portion of an application may be developed. At block 1920, a second portion of the application may be received. At block 1930, a set of warning data may be detected. At block 1940, a curative action may be formulated. At block 1950, the curative action may be carried-out. Aspects of the method 1900 may substantially correspond to other embodiments described herein, including FIGS. 1-19.

In embodiments, a computing artifact may be compiled at block 1960. The computing artifact may be compiled in response to carrying out the curative action. In embodiments, compiling the artifact may include compiling a first and second portion of the application to combine them together into a single computing artifact. The computing artifact may include a digital package, bundle, or container including the computing object in association with the set of warning data. Compiling may include the translation, conversion, or transformation of the programming code into a target programming language (e.g., from a high-level programming language to a lower-level programming language such as assembly language or machine code) using a compiler. In embodiments, compiling may include converting the computing object into an executable program file.

At block 1970, a stream of tuples is received. The stream of tuples may be processed by a plurality of processing elements (e.g., stream operators) operating on a set of compute nodes (e.g., in a stream application environment). The stream of tuples may be received consistent with the description herein including FIGS. 1-19. Current/future processing by the plurality of processing elements may be performed consistent with the description herein including FIGS. 1-19. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In embodiments, the stream of tuples is processed at block 1980. The stream of tuples may be processed by the plurality of processing elements operating on the set of compute nodes. The stream of tuples may be processed consistent with the description herein including FIGS. 1-19. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

In embodiments, use of the warning data may be metered at block 1982. Metering the use of the warning data may include measuring, tracking, documenting, recording, or calculating the degree or extent of the utilization of the warning data. The degree of utilization may be calculated based on the number of times the warning data was accessed (e.g., 10 times, 100 times), the number of times the warning data was compiled (e.g., in association with the computing object), resource usage (e.g., data processed by streaming applications that include the warning data) or other means. Based on the metered use, an invoice may be generated at block 1984. The invoice may include a bill, fee, service charge, or other itemized breakdown specifying compensation for the usage of the set of warning data. Subscription based models are also possible. Method 1900 may conclude at block 1999.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of managing a set of warning data with respect to a development phase in a computing environment, the method comprising:
    detecting, with respect to the development phase, the set of warning data for utilization to develop an application wherein the set of warning data is collected as compile time warning messages associated with a compiler;
    storing the set of warning data with compiled code associated with the application;
    identifying, by analyzing the set of warning data, a relationship between the set of warning data and a component of the application;
    providing, for utilization to develop the application, an indication of the relationship between the set of warning data and the component of the application wherein the component and the associated warning data are accessed in an environment comprising only compiled code objects;
    classifying, with respect to a set of computing challenges, the set of warning data;
    correlating the set of computing challenges with the computing object based on annotating a code location of the computing object with a computing challenge tag indicating a relationship to a particular computing challenge, and storing, in an integrated development environment, an element of the correlation;
    evaluating the set of computing challenges to identify a set of candidate development actions including both a first candidate development action and a second candidate development action;
    computing a first expected resultant computing challenge for the first candidate development action;
    computing a second expected resultant computing challenge for the second candidate development action;
    comparing the first and second expected resultant computing challenges, and
    selecting, based on the second expected resultant computing challenge exceeding the first expected resultant computing challenge, the first candidate development action.

2. The method of claim 1, wherein the computing environment includes a distributed computing environment.

3. The method of claim 1, wherein the computing environment includes a stream computing environment.

4. The method of claim 1, wherein develop the application includes construct implementation code.

5. The method of claim 1, wherein develop the application includes configure a set of parameters.

6. The method of claim 1, wherein develop the application includes provide a set of candidate items.

7. The method of claim 1, wherein the component of the application includes a computing artifact.

8. The method of claim 7, further comprising:
    receiving a stream of tuples to be processed by a set of processing elements which includes the computing artifact and operates on a set of compute nodes; and
    processing, using the set of processing elements operating on the set of compute nodes, the stream of tuples.

9. The method of claim 1, wherein the component of the application includes a computing object.

10. The method of claim 1, wherein the indication includes a selection from a group of features consisting of at least one of:
    a quantitative feature which indicates a number of warnings,
    a qualitative feature which indicates a type of warning, or
    a location feature which indicates a warning position.

11. The method of claim 1, wherein the indication includes a selection from a group of features consisting of at least one of:
    a marking feature to facilitate a filter operation,
    a flagging feature to facilitate a selection operation, or
    a highlighting feature to differentiate the indication.

12. The method of claim 1, wherein providing, for utilization to develop the application, the indication of the relationship between the set of warning data and the component of the application includes:

presenting, in an integrated development environment, a group of features of the relationship between the set of warning data and the component of the application.

13. The method of claim 12, wherein presenting, in the integrated development environment, the group of features of the relationship between the set of warning data and the component of the application includes:
displaying the group of features in an operator graph.

14. The method of claim 1, further comprising:
presenting, for user-selection of at least one of the first candidate development action or the second candidate development action, the first and second expected resultant computing challenges.

15. The method of claim 1, wherein the first and second candidate development actions include a selection from a group consisting of at least one of:
a compilation action,
an execution action, or
a corrective action.

16. The method of claim 1, wherein the first and second expected resultant computing challenges include a set of values which correspond to a selection from a group consisting of at least one of:
a processor utilization factor,
a memory utilization factor,
a disk utilization factor, or
a throughput factor.

17. The method of claim 1, wherein the detecting, the identifying, and the providing each occur in an automated fashion without user intervention.

18. The method of claim 1, further comprising:
metering use of the set of warning data; and
generating an invoice based on the metered use.

19. A system of managing a set of warning data with respect to a development phase in a computing environment, the system comprising:
a memory having a set of computer readable computer instructions, and
a processor for executing the set of computer readable instructions, the set of computer readable instructions including:
detecting, with respect to the development phase, the set of warning data for utilization to develop an application wherein the set of warning data is collected as compile time warning messages associated with a compiler;
storing the set of warning data with compiled code associated with the application;
identifying, by analyzing the set of warning data, a relationship between the set of warning data and a component of the application;
providing, for utilization to develop the application, an indication of the relationship between the set of warning data and the component of the application wherein the component and the associated warning data are accessed in an environment comprising only compiled code objects;
classifying, with respect to a set of computing challenges, the set of warning data;
correlating the set of computing challenges with the computing object based on annotating a code location of the computing object with a computing challenge tag indicating a relationship to a particular computing challenge, and storing, in an integrated development environment, an element of the correlation;
evaluating the set of computing challenges to identify a set of candidate development actions including both a first candidate development action and a second candidate development action;
computing a first expected resultant computing challenge for the first candidate development action;
computing a second expected resultant computing challenge for the second candidate development action;
comparing the first and second expected resultant computing challenges, and
selecting, based on the second expected resultant computing challenge exceeding the first expected resultant computing challenge, the first candidate development action.

20. A computer program product of managing a set of warning data with respect to a development phase in a computing environment, the computer program product comprising a computer readable storage medium having program instructions embodied therewith, wherein the computer readable storage medium is not a transitory signal per se, the program instructions executable by a processor to cause the processor to perform a method comprising:
detecting, with respect to the development phase, the set of warning data for utilization to develop an application wherein the set of warning data is collected as compile time warning messages associated with a compiler;
storing the set of warning data with compiled code associated with the application;
identifying, by analyzing the set of warning data, a relationship between the set of warning data and a component of the application;
providing, for utilization to develop the application, an indication of the relationship between the set of warning data and the component of the application wherein the component and the associated warning data are accessed in an environment comprising only compiled code objects;
classifying, with respect to a set of computing challenges, the set of warning data;
correlating the set of computing challenges with the computing object based on annotating a code location of the computing object with a computing challenge tag indicating a relationship to a particular computing challenge, and storing, in an integrated development environment, an element of the correlation;
evaluating the set of computing challenges to identify a set of candidate development actions including both a first candidate development action and a second candidate development action;
computing a first expected resultant computing challenge for the first candidate development action;
computing a second expected resultant computing challenge for the second candidate development action;
comparing the first and second expected resultant computing challenges, and
selecting, based on the second expected resultant computing challenge exceeding the first expected resultant computing challenge, the first candidate development action.

21. The computer program product of claim 20, wherein at least one of:
the program instructions are stored in a computer readable storage medium in a data processing system, and wherein the program instructions were downloaded over a network from a remote data processing system; or
the program instructions are stored in a computer readable storage medium in a server data processing system, and wherein the program instructions are downloaded over a network to a remote data processing system for use in a computer readable storage medium with the remote data processing system.

\* \* \* \* \*